United States Patent [19]
Beale et al.

[11] Patent Number: 6,035,637
[45] Date of Patent: Mar. 14, 2000

[54] FREE-PISTON INTERNAL COMBUSTION ENGINE

[75] Inventors: William T. Beale, Athens, Ohio; William L. Kopko, Springfield, Va.

[73] Assignee: Sunpower, Inc., Athens, Ohio

[21] Appl. No.: 09/030,067

[22] Filed: Feb. 25, 1998

Related U.S. Application Data

[63] Continuation-in-part of application No. 08/886,647, Jul. 1, 1997, Pat. No. 5,775,273.

[51] Int. Cl.$^7$ .................................................. F02B 71/04
[52] U.S. Cl. ............................... 60/595; 60/653; 60/679; 417/364
[58] Field of Search ............................ 60/595, 653, 679; 417/364

[56] References Cited

U.S. PATENT DOCUMENTS

| | | |
|---|---|---|
| 2,968,287 | 1/1961 | Creighton . |
| 2,970,433 | 2/1961 | Endres ................... 60/595 X |
| 3,119,230 | 1/1964 | Kosoff ....................... 60/595 |
| 3,806,870 | 4/1974 | Kalajian . |
| 4,205,528 | 6/1980 | Grow ......................... 60/595 |
| 4,326,380 | 4/1982 | Rittmaster et al. ........................ 60/595 |
| 5,036,667 | 8/1991 | Thatcher ..................... 60/595 |

Primary Examiner—Hoang Nguyen
Attorney, Agent, or Firm—Rothwell, Figg, Ernst & Kurz

[57] ABSTRACT

This invention is an efficient free-piston internal-combustion engine having an expansion ratio greater than the compression ratio and preferably with gas bearings supporting the piston. The use of gas bearings in combination with high-temperature ceramic materials allows the engine to be nearly adiabatic and with exhaust temperatures in excess of 600° C. These high exhaust temperatures in turn allow the engine to operate as a topping cycle for gas turbines, Stirling engines, steam engines, etc. An improved valving system for flexible control of the engine may include the use of a valve actuator in a piston. In one embodiment, a pair of oppositely disposed combustion chamber passageways extending between the combustion chamber and the earth's atmosphere, each have a combustion-chamber valve for controlling the passage of gas through the passageways. The combustion-chamber valves are essentially simultaneously opened and closed to permit independent variation and control of the compression ratio, expansion ratio, and stroke of the engine. When the valves are opened, the combustion chamber is purged or supercharged with combustion supporting air, and closed to initiate compression. Variable control of the piston positions at which the valves are opened and closed permits the engine to operate at a high efficiency over a broad range of power output loading conditions. In another embodiment the combustion chamber and a gas compressor are combined in the same cylinder.

27 Claims, 18 Drawing Sheets

FREE-PISTON INTERNAL COMBUSTION ENGINE

CROSS-REFERENCE TO RELATED APPLICATION

This application is a continuation-in-part of application Ser. No. 08/886,647, filed Jul. 1, 1997 now U.S. Pat. No. 5,775,273.

TECHNICAL FIELD

This invention relates generally to internal-combustion engines, and more particularly relates to improvements in free-piston internal-combustion engines. A key feature of the invention is the ability run with an expansion ratio that is greater than the compression ratio. This feature combined with the use of low-friction gas bearings can greatly improve the efficiency of the engine. In addition the use of gas bearings eliminates the need for oil and allows the engine to run at much higher temperatures through the use of ceramic material. The higher temperatures in turn allow the possibility of using the free-piston engine as a topping cycle for a heat engine or gas turbine. The combinations of these features give the potential to double full-load energy efficiency compared to conventional engines.

An additional feature of the engine is the possibility of much more flexible control for applications with varying loads. The invention frees the internal-combustion engine from the constraints of the rigid construction limitations of previously existing internal-combustion engines. It does this by uniquely combining features of free pistons, computer control and complete control of valve and valve actuator timing so that the engine can be automatically adjusted to operate under optimum operating conditions for a specific load over a broad range of load conditions. The engine embodying the present invention provides extraordinary freedom of control of all elements or parameters of engine operation so the engine operates at or close to optimum operating conditions for whatever power demand it is currently being presented.

BACKGROUND ART

The internal-combustion engine, fueled by liquid petroleum products, has long been the mainstay for supplying mechanical power to a broad variety of mobile and stationary machines. There have been many developments for improving the fuel conversion efficiency of such engines. Although most internal-combustion engines which are commercially produced and used today utilize reciprocating pistons which are confined to the motion limits permitted by a crank shaft and interconnected connecting rods, there have also been free-piston internal-combustion engines.

FIG. 1 shows an example of prior art related to free-piston diesel engines which were sold commercially in the 1950s. These engines underwent serious commercial development over three decades. Applications ranged from electric power plants, to ships, to automobiles. Examples of early related to free-piston engines include U.S. Pat. Nos. 1,036,288; 1,571,615; 1,657,641; 2,075,137; 2,595,396; 2,814,552. Among the advantages claimed for these engines were:

Insensitivity to fuel: The free-piston engine automatically adjusts the compression ratio to assure complete combustion of the fuel.

High efficiency: The full-load thermal efficiency of the engine for an automotive application including turbine losses where 32–36%, which was significantly better the spark ignition engines at the time.

Smoothness: The opposed-piston arrangement is inherently balanced with virtually no vibration.

Torque multiplication: The turbine acts to increase torque at low speeds, which may simplify design of the transmission.

Low turbine temperatures: This was a major advantage in the 1950's because of the lack of high-temperature materials; this advantage is of much less importance today with modern materials.

Power-to-weight ratio: Was comparable to that of a conventional gasoline engine with drive train, with further weight reduction possible.

Throttle response: The low mass of the moving parts allows the engine and drive train to respond extremely quickly to increased power requirements.

Despite these major advantages and major investments in development of these engines, there were serious problems that eventually brought an end to serious interest in this technology. These problems included poor part-load efficiency, because the piston operated with essentially a fixed stroke in order to uncover the intake and exhaust ports. In addition the engine had problems with durability of the piston rings and was difficult to start. These practical problems combined with the gradual improvement of competing technologies forced the abandonment of the free-piston internal-combustion engine by the 1960's. Charles Fayette Taylor summarizes the modern view of these engines in his book *The Internal-combustion Engine in Theory and Practice*, "The results in each case have been unsatisfactory, and the type may now be considered obsolete."

Since then there has been relatively little advancement in free-piston internal-combustion engines. Examples of more recent patents related to these engines include U.S. Pat. Nos. 4,873,822; 5,123,245; 5,363,651; 4,530,317; 4,415,313; 4,665,703; 5,144,917; and 4,205,528. Although most of these engines can be designed and operated to provide good efficiency at a single selected power output load condition, few engines are called upon to operate under only one load condition. Most internal-combustion engines must supply power which varies over a broad range from a low power to a high power. In addition the use of simple sidewall ports for intake and exhaust makes the length of the compression and expansion strokes essentially the same for these engines, which limits their efficiencies. The engines described in the newer patents still have many of the starting, reliability, control, and efficiency problems of the earlier designs and have not been commercialized.

One significant improvement since the 1950s is described in Lenger U.S. Pat. No. 3,772,722. Lenger describes a free-piston engine that uses gas bearings and ceramic components. The principal purpose of these improvements were to eliminate reliability problems associated with piston rings. It also describes the use of ceramic components with a low coefficient of thermal expansion to reduce clearance required at high temperatures. On the other hand, this patent uses simple sidewall ports for intake and exhaust, which limits the cycle efficiency.

The basic objective of the current invention is to produce an engine that retains or improves the desirable features of earlier designs while solving the problems that forced the abandonment of free-piston internal-combustion engines. Fortunately the last 40 years have seen tremendous improvements to the design of free-piston machines for other applications such as Stirling engines and linear compressors. In addition related materials technology and control technologies have greatly improved. The present invention makes use of these improvements in creative ways to solve the problems of the earlier designs.

A unique feature of the current invention is that it allows the expansion stroke to be greater that the compression stroke. The prior art related to free-piston internal-combustion engines does not include this feature. The longer expansion stroke allows a major increase in cycle efficiency. For example, for a simple air cycle, the ideal efficiency increases from 60 to 80% from a conventional Otto cycle to a cycle with full expansion. This advantage represents a 50% reduction in the theoretical losses. Full expansion also greatly reduces the pressure pulses leaving the engine and may eliminate the need for an exhaust muffler. These features give significant cost and performance advantages.

A second unique feature is the uses of gas bearings to support a free piston combined with an expansion ratio that is greater the compression ratio. Gas bearings greatly reduce friction loss, which allows for full use of a longer expansion stroke. Conventional piston rings or other bearings create such high losses that they would negate most of the theoretical advantage of increasing the expansion stroke. Thus our in our invention, gas bearings play an unforeseen role in allowing a major benefit from a longer expansion stroke.

In addition, the use of gas bearings removes the need for oil or other lubricants which eliminates a major problem with high-temperature operation. Modern ceramics and other material allow the engine to be nearly adiabatic, which eliminates the need for a cooling system. Elimination of the lubricant and higher temperature operation can greatly reduce potential emissions from two-stroke engines and facilitates control of the combustion process. Eliminating oil also eliminates the associated maintenance and reliability issues, which is serious problem for two-stroke engines. Hence this setup effectively removes the need for a cooling system and lubrication system, which greatly simplifies the design of the engine.

A third unique feature of this invention is the combination of a free-piston internal-combustion engine that can provide a high-temperature exhaust with a downstream turbine or heat engine. This setup allows the free-piston engine to serve as topping cycle that can give a power-generating system with extraordinarily high efficiency. This topping cycle is applicable to both new and existing power plants. The combination of all these features has the potential to more than double current engine efficiency. These features also decrease emissions and give rapid response to changes in engine load output.

In addition to these advances, the current invention has the capability of providing much more versatile control over a wide range of operating conditions. Three parameters which are important to both the efficiency and the power of an internal-combustion engine are stroke or displacement, expansion ratio, and compression ratio. Conventional crank-type internal-combustion engines permit no controlled adjustment of any of these parameters. The efficiency of an internal-combustion engine is also a function of the ratio of the compression ratio to the expansion ratio. In the conventional internal-combustion engine, neither is variable. The power of an internal-combustion engine is proportional to the mass flow of air, properly mixed with fuel, through the combustion chamber and therefore is also a function of piston displacement. However, piston displacement is not variable in a crank-type engine.

It is a feature and object of some embodiments of the present invention to provide a free-piston internal-combustion engine in which not only are all four of these parameters controllably variable, but additionally the expansion ratio and the compression ratio are adjustable independently of each other. This permits the engine to operate with a different expansion ratio than compression ratio and also allows the displacement or stroke of the engine to be controlled. Consequently, upon a low power demand the engine of the present invention can operate with an expansion ratio which is considerably greater than the compression ratio so that it can operate with more nearly full expansion, resulting in a higher proportion of the heat energy of combustion being converted to mechanical output power. For greater power demands, both the engine displacement and the expansion ratio can be varied so as to achieve maximum efficiency for a given power demand.

BRIEF DISCLOSURE OF THE INVENTION

This invention is a free-piston internal-combustion engine with improved control over flow of gas into and out of the cylinder. A key improvement over the prior art is the use of an expansion stroke that is greater than the compression stroke. The increased expansion stroke significantly improves the cycle efficiency of the engine.

Another important feature is the use of gas bearings that greatly reduce friction. This feature allows the piston to extract more useful work from a longer expansion stroke with a minimum of friction loss. The lower friction losses also have the potential to greatly improve efficiency of the engine at low load conditions since they greatly reduce the fixed losses of the engine. The gas bearings also allow for the elimination of piston rings, which were a major reliability problem in the prior art. Gas bearings eliminate the need for engine oil, which reduces emissions, simplifies engine design, reduces operating costs, and removes a major barrier to high-temperature operation. Nearly adiabatic operation is possible using gas bearings in combination with ceramics and other high-temperature materials. In addition the engine can provide a much higher exhaust temperature which allows for the potential to recover additional work using a heat engine or gas turbine downstream of the engine.

Some embodiments are improved free-piston internal-combustion engines of the type having at least one piston slidingly and sealingly reciprocatable in a cylinder and preferably having two opposed pistons reciprocating in opposite directions within the cylinder. The piston is preferably supported by gas bearings. Each piston has an end face bounding and defining a central combustion chamber. The engine also includes a driver linked to the piston for driving the piston through its compression stroke. The driver is preferably a spring acting upon each piston and storing energy during the expansion stroke of the piston in order to obtain a flywheel effect. The engine also includes a fuel injector, and may also include a spark ignitor for initiating combustion.

Another improvement in some of the embodiments relates to much more flexible controls. This improvement includes at least one and preferably two combustion-chamber valves, each in a passageway extending between the combustion chamber and another volume for controlling the passage of gas between the combustion chamber and the other volume. A valve-closing and opening actuator is linked to at least one combustion-chamber valve. A piston-position sensor is linked to the valve-closing actuator and initiates closure of the valve in response to a selected controllably variable position of the piston in the cylinder. A piston-position-responsive, valve-opening actuator is also linked to the combustion-chamber valve. The two combustion-chamber valves open and close essentially in synchronism. Preferably a blower or other air-impeller apparatus is connected to the passageways for purging the combustion chamber when the combustion-chamber valves are opened and for providing air for supporting combustion. This function can also be done by tuning the inlet and exhaust passages so that the momentum of the gas can assist the purging process, as is known in the art. This momentum purging is enhanced in the free-piston machine as a result of its more constant frequency in comparison to the crank engine, since tuning of the ports for best scavenging is strongly determined by frequency.

In operation, the valves are opened to vent the combustion chamber near the desired end of an expansion stroke. Opening the valves terminates the expansion of combustion gas and initiates exhaust and purge of combustion products and, with a sufficient blower, supercharging of the combustion chamber. The valves are closed to terminate the venting and the purge at a controllably variable piston position, thus terminating the exhaust and initiating the compression.

Under varying load conditions, engine control can include not only varying the quantity of fuel injected into the combustion chamber, but also varying the piston position at which the valves are opened and the piston position at which the valves are closed in order to tailor the engine operation so that it provides the required engine power at the maximum efficiency at which that power can be supplied.

For low power the closing of the exhaust valve is delayed appropriately as the pistons move inward, so that a smaller amount of air is in the cylinder to be compressed when the valves shut, and thus a smaller amount of fuel is required to be injected. This reduced mass of fuel and air goes through the conventional combustion and expansion and exhaust cycle so that result is lower power. This method of power reduction is more efficient than the conventional spark ignition engine's method of reducing the pressure in the inlet process by way of a throttle. The throttling process is wasteful of energy and reduces the overall thermal efficiency of the engine. On the other hand, in the present invention, there is no such throttling needed, and instead a lesser amount of air is in the engine for compression, ignition, and expansion. This is a more efficient way of reducing power. It is the equivalent of having smaller engine when low power is required, rather than throttling a bigger engine.

This reduction of air flow through the engine also necessitates a change in the spark timing, exhaust-valve opening, and fuel injection. All these controls are possible in this machine as a result of its great flexibility of operation derived from variable valve timing.

DETAILED DESCRIPTION

Figure 1:
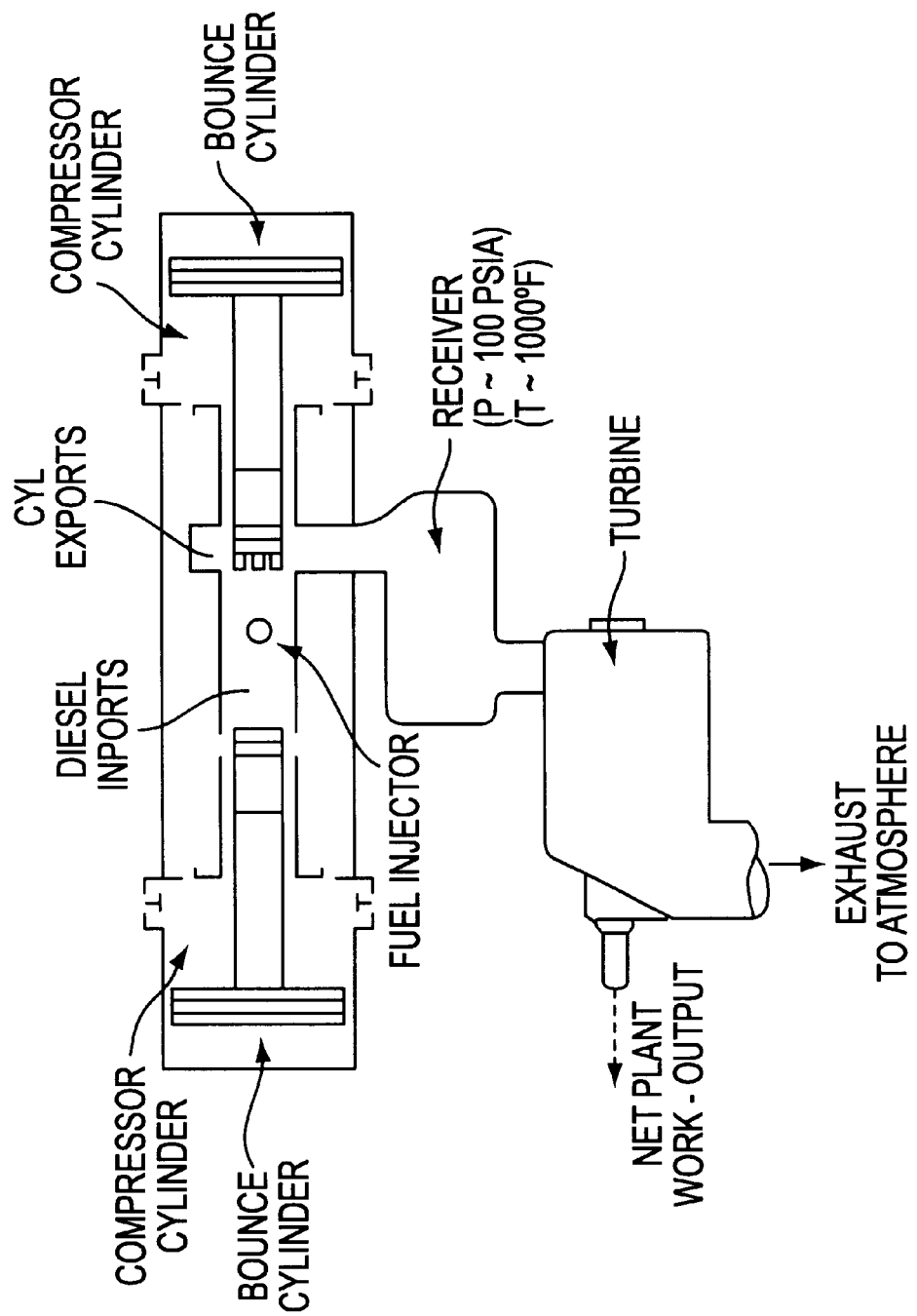
FIG. 1 is prior art for a free-piston internal-combustion engine.
Figure 2:
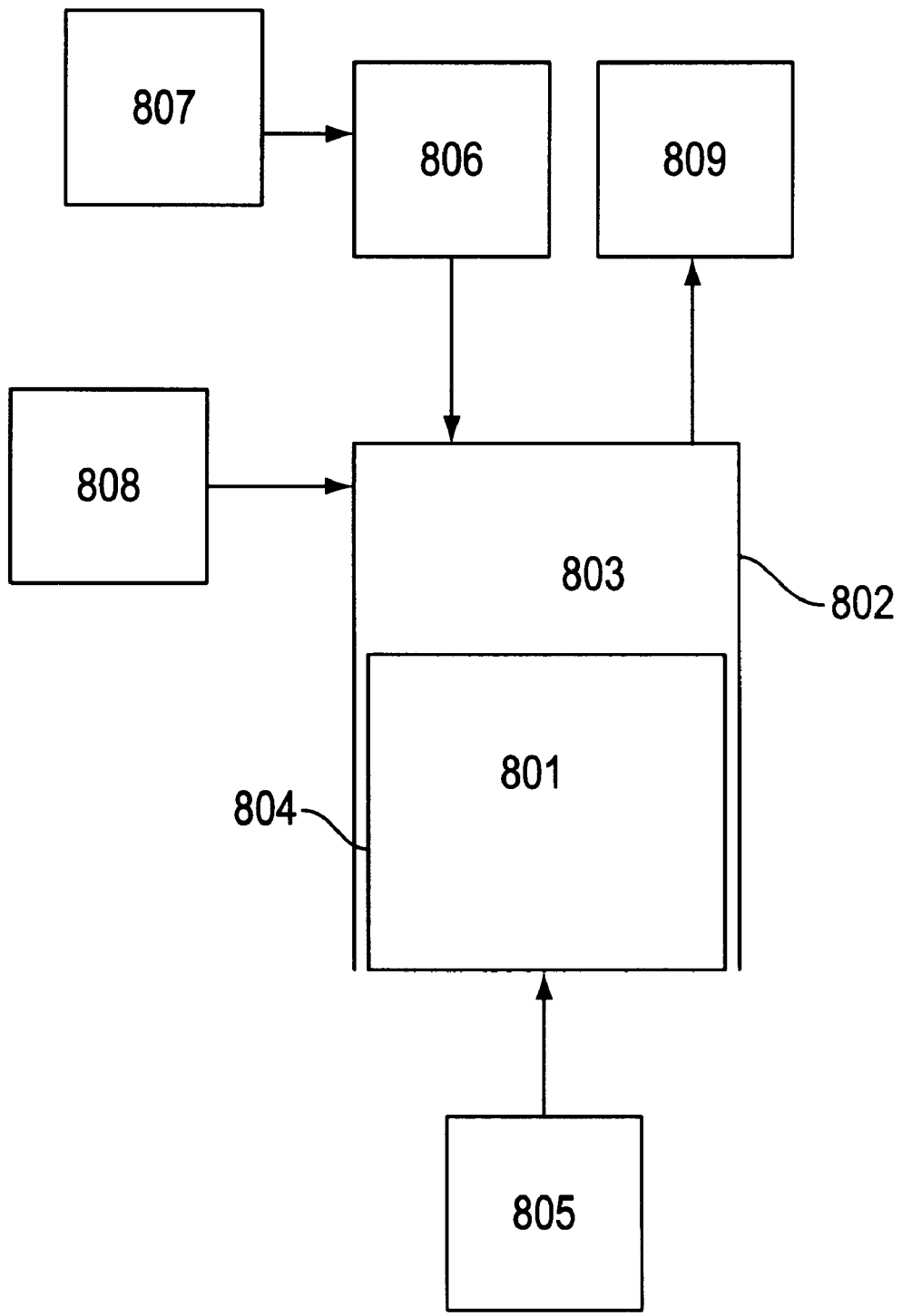
FIG. 2 is block diagram of a basic embodiment of the engine.

FIG. 2 shows a basic configuration of the engine. A free piston 801 reciprocates in a cylinder 802 and defines one end of a combustion chamber 803. The piston is preferably supported by gas bearings 804. A driver 805 attached to the piston moves the piston up during the compression stroke and can also move the piston during the intake and exhaust portion of the cycle. An intake means 806 is connected to the combustion chamber and a source of gas that can support combustion 807. The source of gas that can support combustion is normally the atmosphere; but could be bottled air, oxygen, or other oxidizing material. A means for adding fuel 808 is also connected to the chamber. The means for adding fuel is preferably a fuel injector, but it can also be a carburetor in which case it is combined with the intake means. The means for adding fuel would normally include a piston-position sensor or other means to ensure proper timing of the fuel injection. An exhaust means 809 is also connected to the chamber and removes the products of combustion from the chamber. The preferred exhaust means is a valve located on the perimeter of the combustion chamber with a pathway between the valve and the atmosphere. The operation of the intake and exhaust means allows the expansion stroke of the piston to be greater that the compression stroke. The preferred way of achieving this control is to allow the exhaust means to continue to operate for the first part of the up stroke, while shutting off the intake means. For the expansion stroke the preferred mode of operation is to start operation of both the exhaust and intake as the piston reaches the end of its down stroke. Work may be extracted from the piston by using it to drive a hydraulic or pneumatic pump, a linear alternator, or other means.

Figure 3:
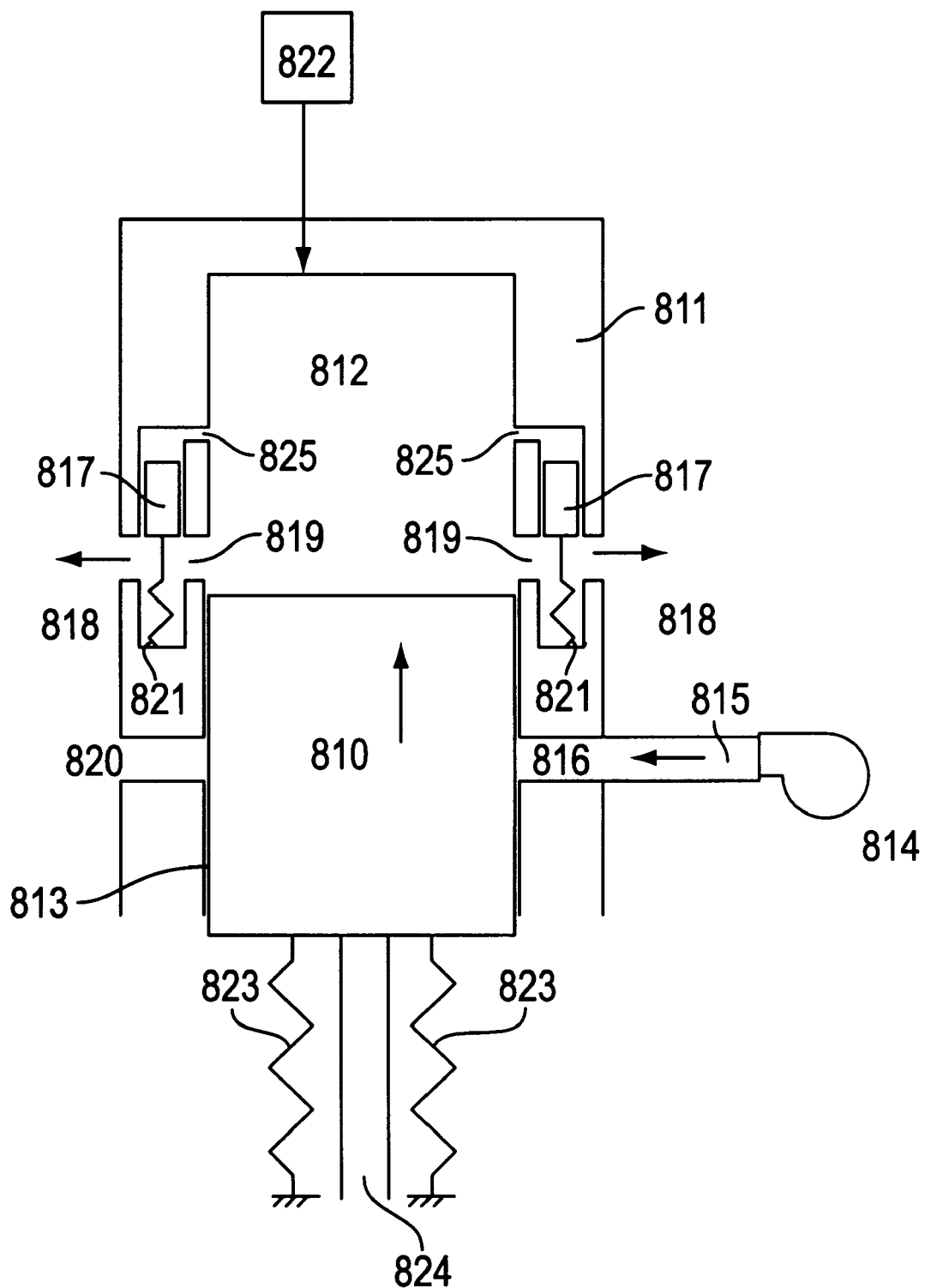
FIG. 3 is an embodiment that uses simple mechanical control for intake and exhaust timing.

FIG. 3 shows a basic preferred embodiment. The piston 810 reciprocates in a cylinder 811 which defines a combustion chamber 812. The piston is connected to output shaft 823 and springs 824 which act as a driver to move the piston during the compression part of the stroke. The piston is preferably a free-piston supported by gas bearings 813. A blower 814 pressurizes fresh air and supplies it to the combustion chamber through a pathway 815 to intake port 816. A valve 817 that is actuated by the pressure from actuating port 825 inside the cylinder covers an auxiliary exhaust port 818 during the expansion stroke. The valve is preferably in the form of a ring around the cylinder. Multiple ports 819 in the cylinder balance the loads on the valve. The piston eventually uncovers the main exhaust port 820 and intake port 816 which reduces the pressure in the cylinder and allows a spring 821 to open the auxiliary port. Fresh air can then flow from blower 814 through the intake port to purge the exhaust gasses. As the piston starts the up stroke it covers the main exhaust port and intake port. The pressure in the cylinder remains close to exhaust pressure until the piston covers the auxiliary exhaust port. At that point the piston begins the compression stroke and a fuel injector 822 adds fuel to the chamber. The fuel then ignites and the cycle then repeats itself.

While this figure shows a compression ignition engine, spark ignition is also an option. Another option is to use opposed pistons rather that a single piston. Still another option, though not preferred, is to attach the piston to conventional crank mechanism with the associated bearings and piston rings.

Figure 4:
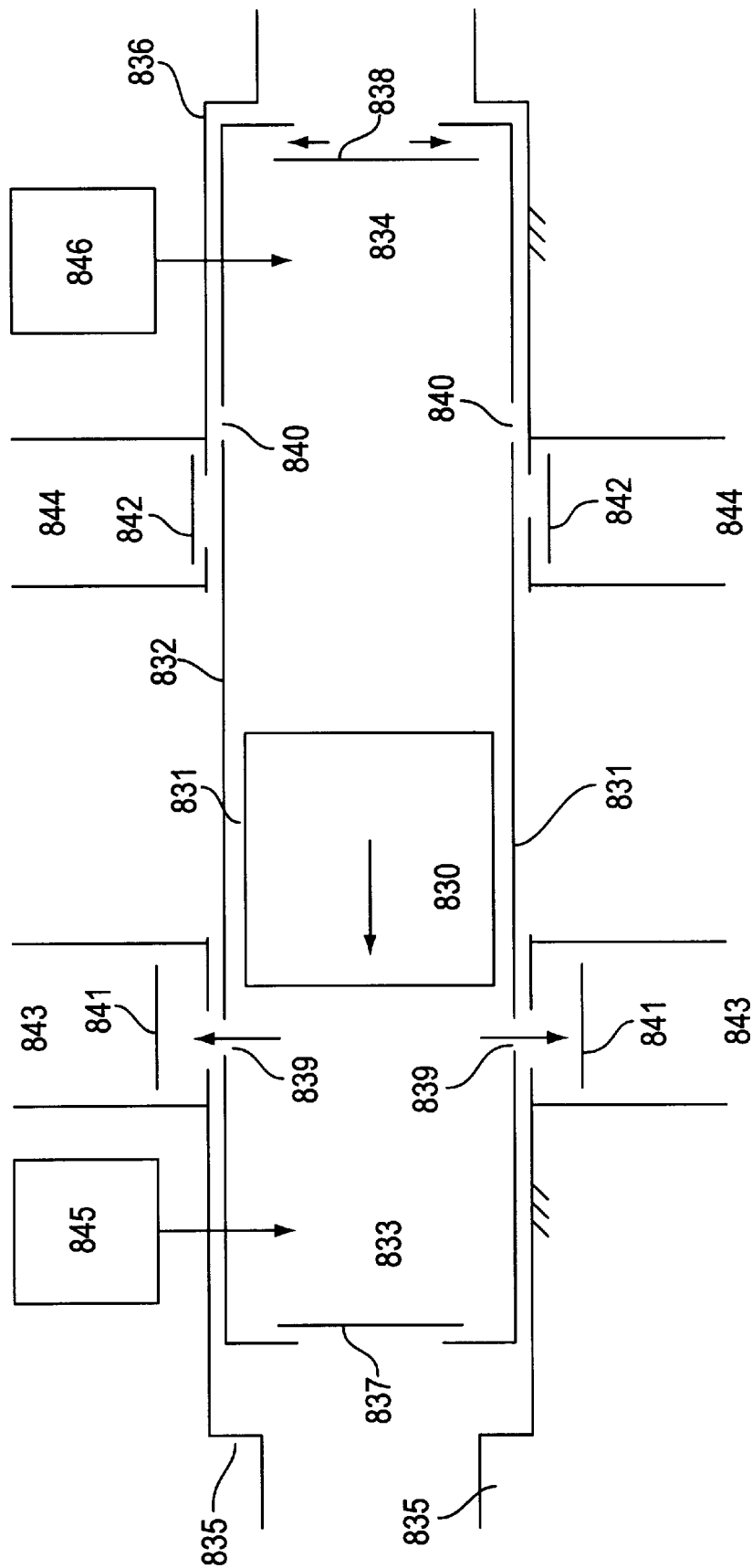
FIG. 4 is another embodiment in which the engine combustion chamber also serves as a compression chamber.

FIG. 4 shows another preferred embodiment in which the combustion chamber can also serve as a compressor. This embodiment is an improvement on a double-acting two-stroke engine described in Matricardi, U.S. Pat. No. 1,036, 288. A piston 830 that is supported by gas bearings 831 reciprocates in a cylinder 832. The piston moves between two combustion chambers 833 and 834. The cylinder is not fixed and is allowed to slide between two stops 835 and 836. Intake check valves 837 and 838 are located at the ends of the cylinder. Discharge ports 839 and 840 are found in the sidewall near the end of the cylinder. Check valves 841 and 842 are located in the exhaust lines 843 and 844 to prevent back flow into the combustion chambers. Fuel injectors 845 and 846 supply fuel to each combustion chamber. Movement of the cylinder covers and uncovers the discharge ports.

The operation of this engine takes full advantage of the energy of the expanding gas. The cycle starts with the piston at the right end of the cylinder in FIG. 4. Ignition in the right combustion chamber occurs which forces the piston to move rapidly to the left. The force of the ignition and the compression stroke before ignition force the cylinder to move slightly to the right. The cylinder movement covers the right discharge ports 840 which means that the high-pressure gasses cannot vent through these ports during the expansion stroke. The same cylinder movement uncovers the discharge ports 839 in at the left side of the cylinder. As the piston moves left, it compresses the gas in the left chamber until the left discharge valves open and allow the gas to escape. Eventually the pressure inside the right combustion chamber falls below that of the gas at the intake valve 838 and additional gas enters the chamber. At the same time the piston moves by and covers the discharge ports on the left side of the cylinder and compresses a quantity of gas in preparation for ignition. Fuel is then injected into the left chamber, followed by ignition and the cycle begins again.

A turbine may be connected to the discharge from the engine. The power from the turbine drives can drive a generator and a supercharger for the engine. This turbocharger-generator arrangement allows the engine to efficiently generate power and controls air flow to the engine.

A new feature that this engine shares with the engine described in FIG. 3 is the capability of providing an expansion stroke that is greater than the compression stroke. The compression stroke starts when discharge valve closes and ends at ignition. The expansion stroke starts at ignition and ends when the intake check valve opens. Since the gas is still expanding as the piston moves by the closed discharge port, the result is that the expansion stroke is much longer than the compression stroke. This longer expansion stroke allows the engine to make full use of the energy in the expanding gas.

In the prior art both the compression stroke and expansion stroke are essentially the same length. In previous designs the discharge check valve opens when the piston uncovers the discharge port after ignition. As the valve opens, it allows gas to escape from the cylinder, which ends the expansion stroke. The compression stroke starts when the piston covers the discharge port before ignition. The result is that both the compression stroke and the expansion stroke are the distance between the discharge port and the point of ignition. The new engine thus has a much longer expansion stroke than previous designs, which should improve engine efficiency.

The embodiment in FIG. 4 has several important advantages over the prior art. The first advantage is that it includes a mechanism for covering the discharge port during the expansion stroke, which allows full expansion of the products of combustion and improves efficiency. Another advantage is that the piston is supported by gas bearings, which reduce friction and eliminate the need for oil or other lubricant. An additional advantage is the possible use of ceramic materials, which can withstand very high temperatures. The ability to operate at high temperatures mean that no cooling system is needed.

While this embodiment shows a movable cylinder for controlling the opening and closing of the discharge port, other arrangements are possible. For example, the valve arrangement in FIG. 3 could also be used with this embodiment. Another possibility is use some kind of valve actuator to control the discharge port.

While the preferred operating mode for the embodiments in FIGS. 3 and 4 is with full expansion, simple changes to the engines would allow them to run in a high-power mode without full expansion. For the engine in FIG. 3, simply blocking the auxiliary ports would allow the engine to operate with a conventional Otto cycle. Similarly, fixing the cylinder position of the engine in FIG. 4 so that the discharge valves can allow gas to escape immediately after ignition would disable the full-expansion feature. The ability to change operating mode would allow the engines to temporarily meet a high load, though at the expense of an efficiency penalty.

Figure 5:
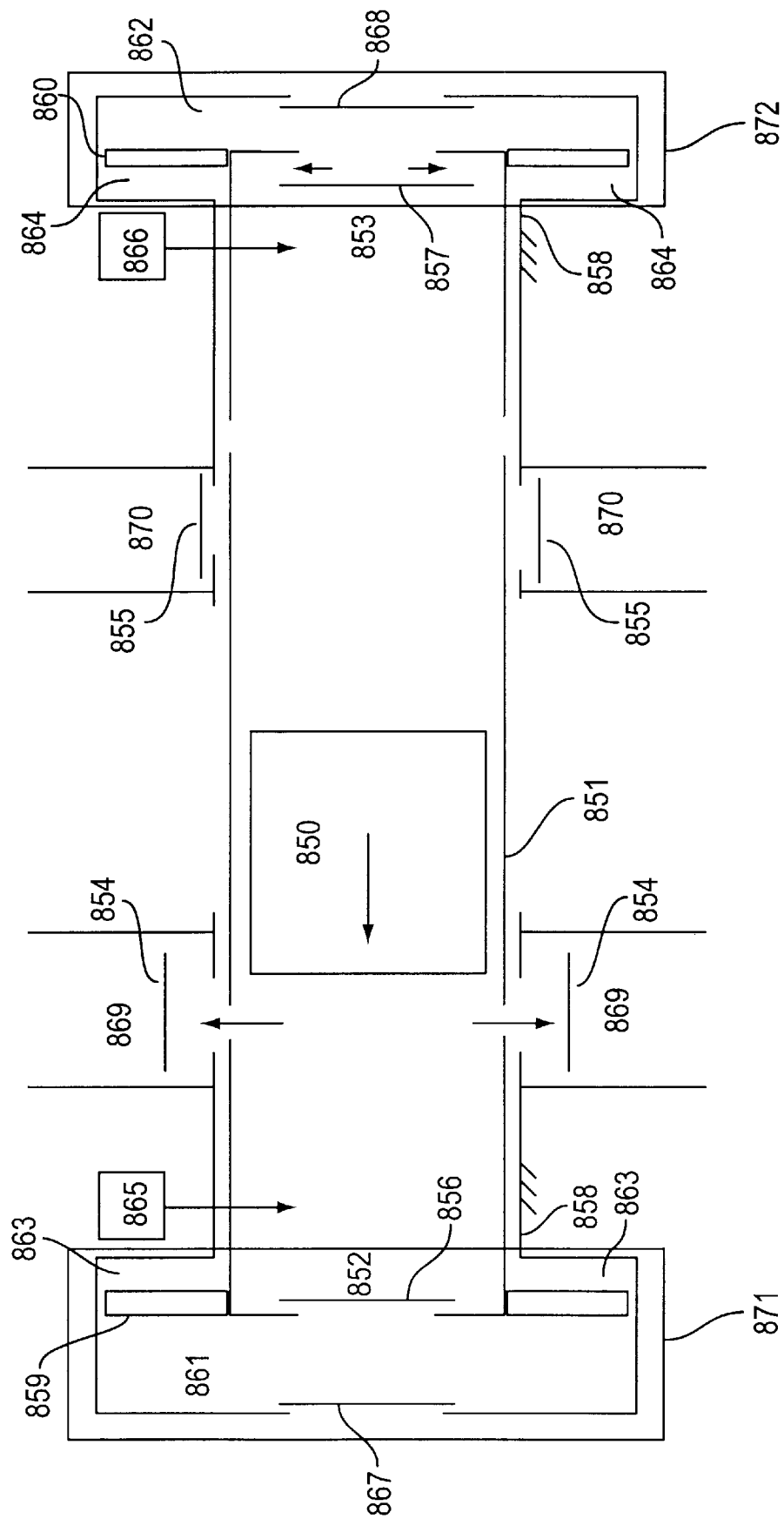
FIG. 5 is an embodiment in which the piston is between two combustion chambers.

FIG. 5 shows another implementation of the embodiment in FIG. 4 that uses the moving cylinder to drive pistons for compressors located at each end of the engine. As with FIG.

4, a piston 850 reciprocates in an inner cylinder 851 between two combustion chambers 852 and 853. The inner cylinder 851 in turn reciprocates inside an outer cylinder 858. Discharge valves 854 and 855 control the flow out of the chambers. Intake valves 856 and 857 control the flow into the chambers.

The chief difference between FIG. 5 and FIG. 4 is the addition of compressor chambers, 871 and 872 at each end of the engine. Inner cylinder 851 drives pistons 859 and 860. These pistons have compressor cylinders 861 and 862 on the outside and bounce chambers 863 and 864 on the inside. Fuel injectors 865 and 866 supply fuel to each combustion chamber. Suction valves 867 and 868 allow fresh air into the compressor cylinders. Discharge lines 869 and 870 direct discharge gas away from the engine. The discharge lines would normally be connected to a turbine for extracting work before discharging the gas to the atmosphere.

Figure 6:
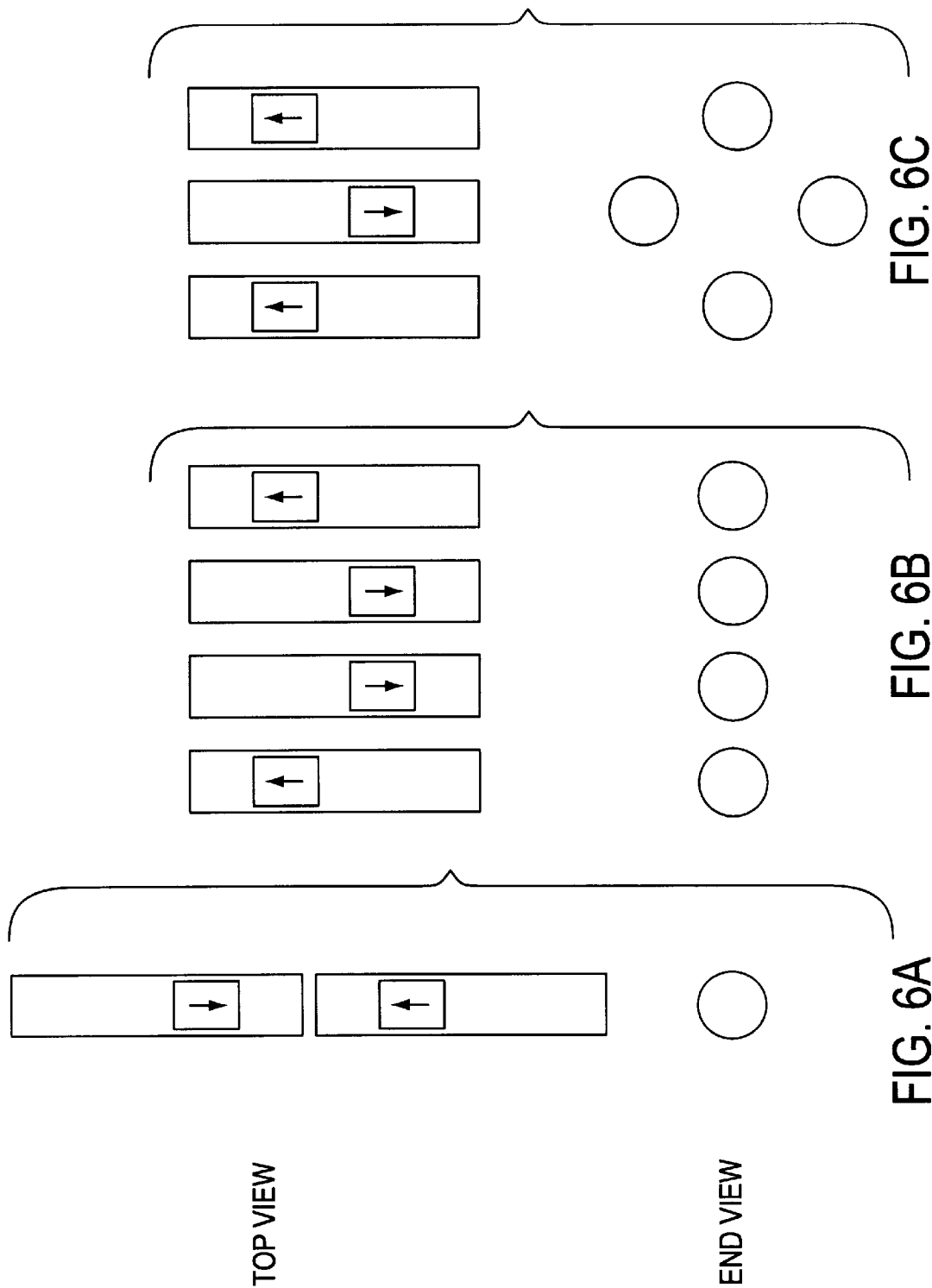
FIG. 6 shows how multiple cylinders may be arranged to control vibration for single-piston engines.

FIG. 6 shows how these engines can be mounted together to minimize vibration. Configuration A shows two cylinders that share a common axis. The controls keep the pistons 180° out of phase so the forces balance. These controls may include fuel injection timing and quantity, spark timing, and controls on the output pressures. Configuration B shows four cylinders in line. The pistons in the two end cylinder move together while the middle pistons are 180° out of phase. Configuration C shows another arrangement that achieves similar objectives. The four cylinders are arranged in a rectangle. Each piston in phase the with opposite piston and 180° out of phase with the adjacent pistons. This figure shows three good configurations; other arrangements are possible which achieve the goals of balancing forces.

Figure 7:
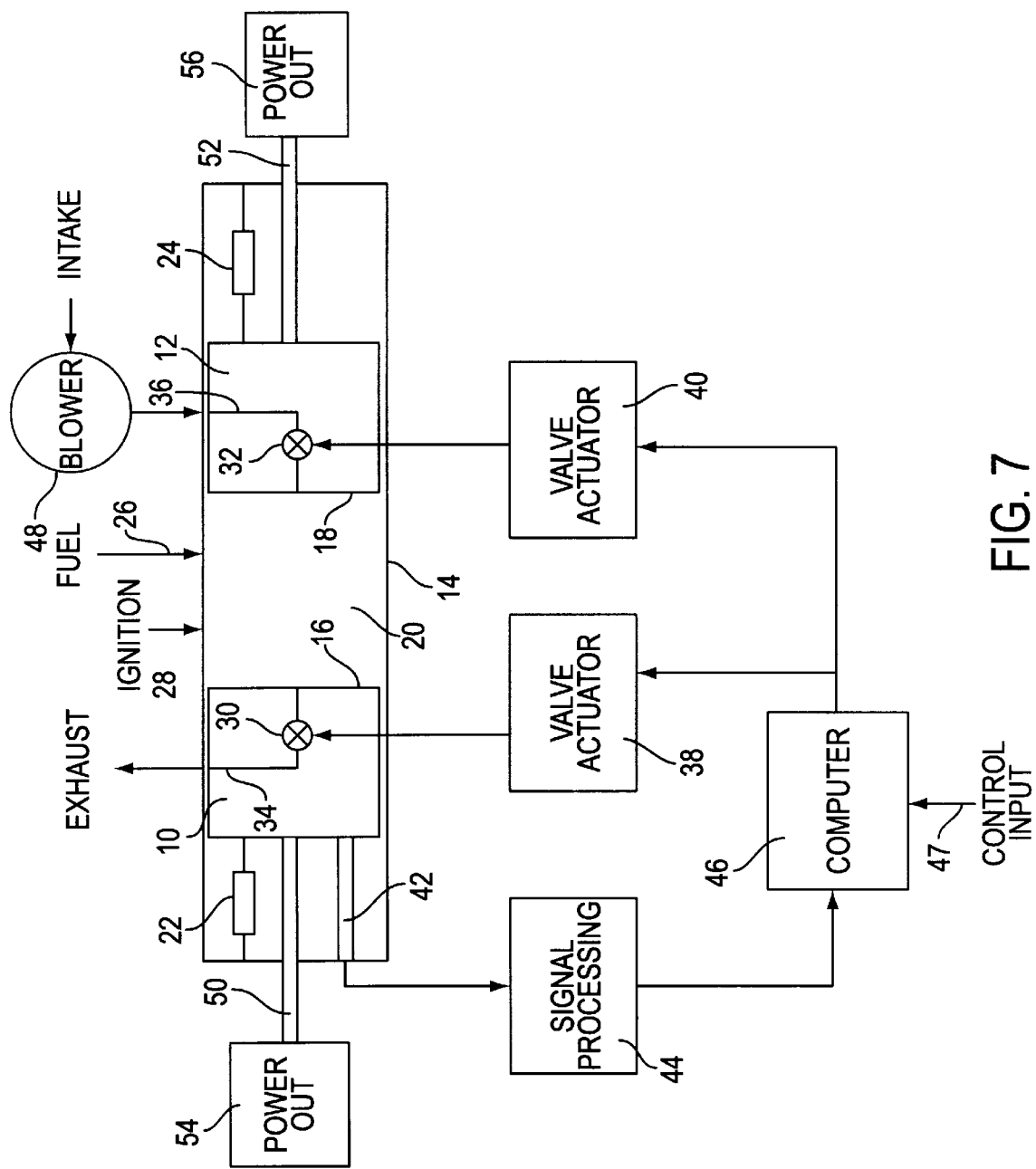
FIG. 7 is a block diagram illustrating fundamental principles of the present invention.

These embodiments illustrate engine designs that can achieve very high design efficiency using simple mechanical controls. Much more flexible control is also possible which can give excellent efficiency over a wide range of power output. Fundamental principles of the versatile control features of the present invention are illustrated in FIG. 7. FIG. 7 illustrates a free-piston internal-combustion engine having a pair of pistons 10 and 12, sealingly slidable and reciprocatable in a cylinder 14 and operated in opposed phase. End face 16 of piston 10 and end face 18 of piston 12 bound and define a combustion chamber 20.

A driver 22 is linked to piston 10 and a similar driver 24 is linked to piston 12 for driving the respective pistons through their compression strokes. Such drivers are known to those skilled in the art and preferably comprise an energy storage device for storing energy resulting from the work generating expansion stroke, and returning the stored energy to the piston during the compression stroke in order to obtain a flywheel effect. The preferred driver is a coil spring, gas spring, planar spring or other spring having a spring constant for resonating the piston mass at a selected operating frequency of the engine. Alternatively, the driver may be a hydraulic, pneumatic, mechanical inertia or electrical system for storing and returning energy in the manner known in the art. For example, a part of the power output can be used to drive a hydraulic motor providing a high-pressure reservoir of hydraulic fluid used to drive a hydraulic cylinder or other hydraulic actuator utilized as the driver 22 or 24.

The engine also has a fuel injector 26, preferably for injecting fuel under high pressure in the manner and utilizing structure common in the prior art. The engine preferably has an ignition system 28, such as a conventional spark plug, although ignition can be initiated by sufficient compression of the fuel as is common in diesel engines. Preferably, however, the spark is a high energy spark for ignition of lower volatility fuels to permit operation of the engine with a broad range of fuels, such as kerosene, natural gas, diesel fuel, gasoline and hydrogen, for example.

A combustion-chamber valve 30 is provided in piston 10, and similarly a combustion-chamber valve 32 is provided in piston 12. Each combustion-chamber valve is connected with a passageway, 34 and 36 respectively, so that each combustion-chamber valve controls the passage of gas between the combustion chamber 20 and the earth's atmosphere or other space such as a gas turbine inlet or supercharger. The combustion-chamber valve 30 is connected to a valve actuator 38, and the combustion-chamber valve 32 is connected to a valve actuator 40. Although each valve actuator generally may operate both to close and to open each of the respective valves, it will be seen that it is alternatively possible that one of the valves, such as valve 32, can be a check valve, and the other valve may be closed by the valve actuator and opened by gas pressures in some embodiments of the invention. In recent years the prior art has developed various electrically controlled valves which are sufficiently fast that they would also work well as the combustion-chamber valves of the present invention.

At least one of the pistons, piston 10 in FIG. 7, is provided with a piston position transducer 42 for providing a signal representing the piston position. A variety of such piston position transducers are known to those skilled in the art. These include a strain gauge mounted to a coil spring, a linear, variable differential transformer or any of the position transducers illustrated in the following U.S. patents which are hereby incorporated by reference: U.S. Pat. Nos. 5,342,176; 4,926,123; 4,912,409; 4,866,378; and 4,864,232. The piston position transducer 42 is connected to a signal processing circuit 44, which may include an analog to digital converter, which in turn is connected to a digital computer 46. All of the actuating and control functions are controlled by the computer, just as such functions are conventionally controlled in modern conventional, internal-combustion engines.

The position transducer 42, signal processing circuit 44 and computer 46 operate as a piston-position sensor which is connected to the valve actuators 38 and 40 in the generalized embodiment of the invention. Together they provide a signal to the valve actuators 38 and 40 at a selected piston position for closing the valves 30 and 32. Generally, they may also provide a different signal to the valve actuators 38 and 40 for opening those valves. A control input 47 may also be provided to the computer 46 for controlling the engine, such as for controlling its power output or stroke or other parameter or parameters. The control input 47 may also be incorporated into a feedback control system.

Although both combustion-chamber valves 30 and 32 may be directly opened by valve actuators when the piston-position sensor detects a selected piston position, check valves or other pressure responsive valves will open and close in response to pressure differentials across them. Such pressure responsive valves are piston position responsive in the invention in the sense that the pressure within the combustion chamber is a function of piston position.

Alternatively these functions can be controlled by older methods such as electromechanical or hydraulic devices or sliding contacts or the like, or other means as known in the art. While these simple mechanical methods are less flexible than full computer control, they can reasonably approximate the optimum desired timing of events so as to be useful In operation, the combustion-chamber valves 30 and 32 are opened and closed nearly simultaneously, although not necessarily precisely simultaneously because of inertia and gas dynamic effects. A blower 48 is preferably provided for purging combustion product gasses from the combustion chamber when the combustion-chamber valves 30 and 32 are opened and for charging the combustion chamber with air for supporting combustion. The pressurized air is forced by the blower through passage 36, valve 32, the combustion chamber 20, valve 32 and passage 34. The blower 48 may operate at a pressure only slightly above atmospheric pressure to accomplish purging, or it may be a supercharger so it can not only purge, but also provide increased air mass in the combustion chamber.

Pistons 10 and 12 are connected through connecting rods 50 and 52 to respective loads 54 and 56 representing useful power out. Suitable loads are those conventionally known in the art and include hydraulic pumps, pneumatic pumps and electrical alternators. Some power from these loads can be used for driving auxiliary systems of the engines, such as the ignition and electronic processing systems, the air blower and the valve actuators. The hydraulic, pneumatic or electric power generated can also be stored for use in start-up by means of storage devices known in the art.

Operation of the invention may be described in connection with the pressure/volume diagram of FIG. 13. When the pistons 10 and 12 are at the outermost or distal position of their reciprocation paths, their position corresponds to point A in FIG. 13. The valves 30 and 32 are opened at point A and the pistons 10 and 12 are driven inwardly toward their central position by the drivers 22 and 24. As the pistons move inwardly from point A to point B along this initial, purge portion of the compression/purge stroke, no compression occurs and the blower forces combustion products from the combustion chamber and recharges the combustion chamber with fresh air. When the piston position of point B is detected by the piston-position sensor, the piston-position sensor actuates valve actuators 38 and 40 to close the valves 30 and 32 and initiate compression. Compression continues as the pistons move from point B to point C. Immediately after point C, fuel is injected and ignition is initiated and continues at least to approximately point D. The thermal energy of the combustion increases the pressure of the gas and then the movement of the piston continues to expand the gasses in the combustion chamber driving the pistons 10 and 12 apart along the expansion stroke to near point A. At this point the exhaust valve opens and the cycle is repeated.

Consequently, in the present invention the combustion chamber is vented at a piston position near the end of an expansion stroke to terminate further expansion of combustion gas and initiate exhaust of combustion products and recharging of the combustion chamber. The venting is terminated by closing the valves at a controllably, variable piston position B to terminate the exhaust and initiate compression. The invention permits varying of at least one and preferably both of the piston positions at which the valves are opened and closed to initiate and terminate venting in response to variations in desired output power and/or desired efficiency. Since expansion ratio is a function of the piston position at which the combustion-chamber valves are opened and compression ratio is a function of the piston position at which the combustion-chamber valves are closed, both the expansion ratio and the compression ratio may be independently controlled. Because piston stroke is a function of the positions at which the valves are opened and closed and the quantity of fuel which is combusted, the present invention not only permits independent, direct control of the piston position at which compression is initiated and the piston position at which expansion is terminated, but also permits control of the displacement or length of engine strokes.

Figure 8:
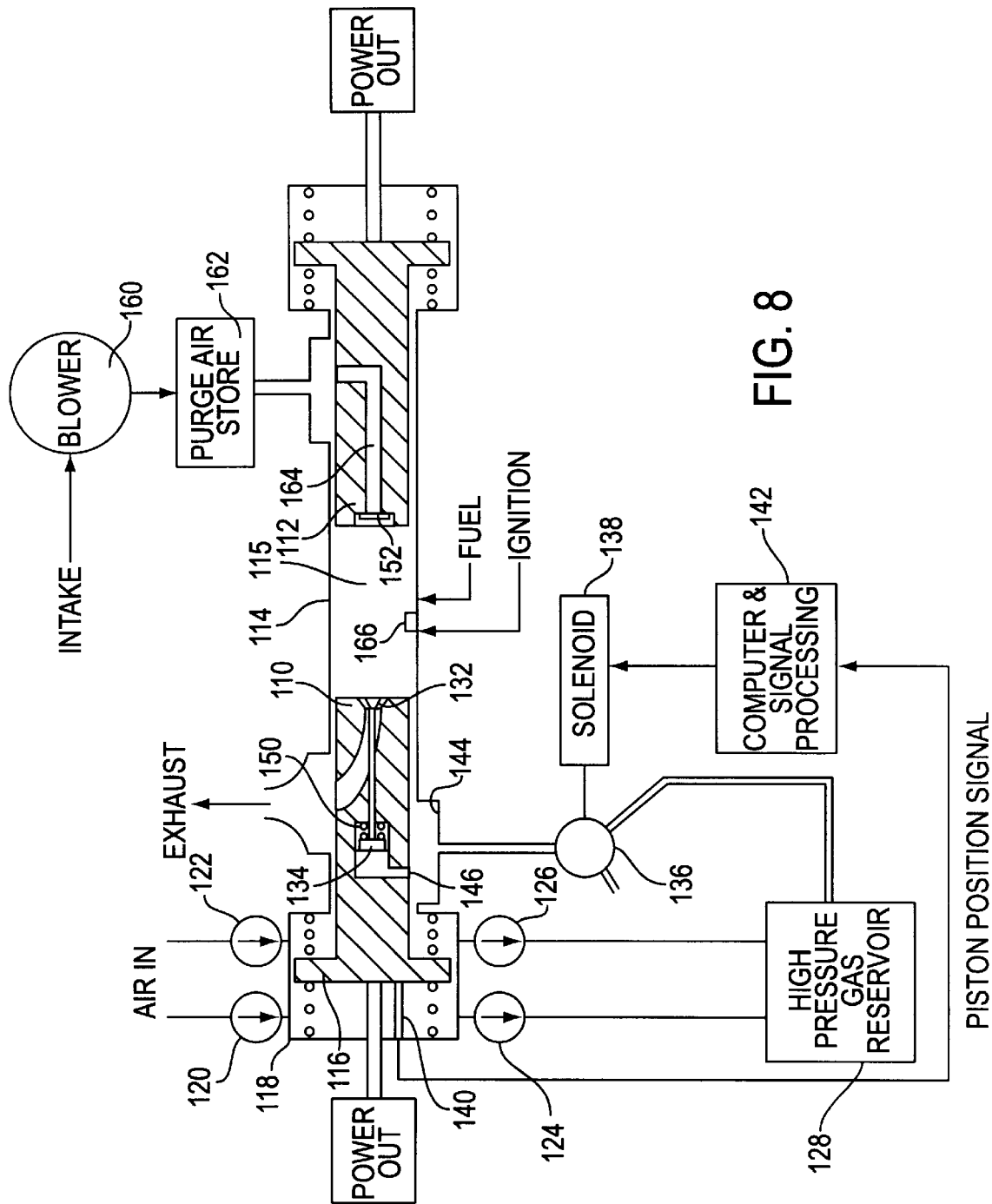
FIG. 8 is a diagram illustrating an embodiment of the invention.

FIG. 8 illustrates an alternative embodiment, including a variety of alternative components which may be substituted in other embodiments of the invention. The engine of FIG. 8 has a pair of pistons 110 and 112 reciprocating within a cylinder 114. Each piston is integrally formed with an air pumping apparatus. Piston 110 is identical to piston 112 so only one is described. A secondary piston 116 is formed as a skirt on the primary piston 110 and reciprocates within a pump cylinder 118. The pump is conventional in structure and double acting and is provided with intake check valves 120 and 122 and exhaust check valves 124 and 126. This air pump serves to pump ambient air into a high-pressure gas reservoir 128 forming an accumulator which is used in a pneumatic system for operating the valve actuators. The driver for storing energy during the expansion stroke and driving the piston inwardly during the compression/purge stroke is a double acting coil spring 130, having a spring constant for supporting the piston 110 in resonance at or near the design frequency of operation of the engine.

The combustion-chamber valve 132 is opened and closed by gas pressure applied and released from the high-pressure gas reservoir 128 and acting upon a piston 134. The application and release of the pressure is controlled by a Y valve 136 which in turn is actuated by a solenoid 138 switched between two states. A piston position transducer 140 senses the instantaneous piston position and applies its signal to a computer and signal processing circuit 142 in the manner described in connection with FIG. 7. The high-pressure gas is applied through the Y valve 136 to an annular groove 144 formed in the cylinder wall. The annular groove 144 is in registration with a port 146 in communication with the actuator piston 134. The annular groove 144 must extend in the axial direction sufficiently far to remain in communication with the port 146 during the stroke of the piston 110. The valve 132 is opened when the solenoid is switched to its first state and switches the Y valve 136 to apply pressure from the reservoir 128 to the valve actuator piston 134. The valve 132 is closed when the solenoid switches to its second state and switches the Y valve 136 to vent the high-pressure gas from the annular groove 144, permitting a coil spring 150 to force the valve 132 closed. Therefore, the piston 134, spring 150, valve 136, solenoid 138 and high-pressure reservoir 128 together provide a valve actuator responsive to the pressure applied from the fluid pressure source 128 and controlled by the interposed control valve 136.

The second combustion-chamber valve 152 in piston 112 is a check valve not requiring a separate valve actuator and may be used alternatively in some embodiments of the invention. The check valve 152 opens after the combustion-chamber valve 132 is opened at the end of the expansion stroke as a result of the pressure applied by the blower 160 and an associated purge air store 162. The differential pressure across the check valve 152 after combustion-chamber valve 132 is opened permits forced air flow into the combustion chamber 115 through the intake passageway 164, but prevents flow in the opposite direction during compression, combustion and expansion.

Alternatively this intake check valve may be opened by the reduction in pressure to subatmospheric in the cylinder caused by the momentum effects of the exhaust gas. High gas velocity through the exhaust valve when it opens combined with careful design of exhaust duct geometry can enhance these momentum effects and reduce pressure inside the cylinder to levels well below atmospheric. These momentum effects are known in prior art.

FIG. 8 also illustrates the use of a conventional pair of spark plug electrodes 166 for initiating ignition in the conventional manner.

Figure 9:
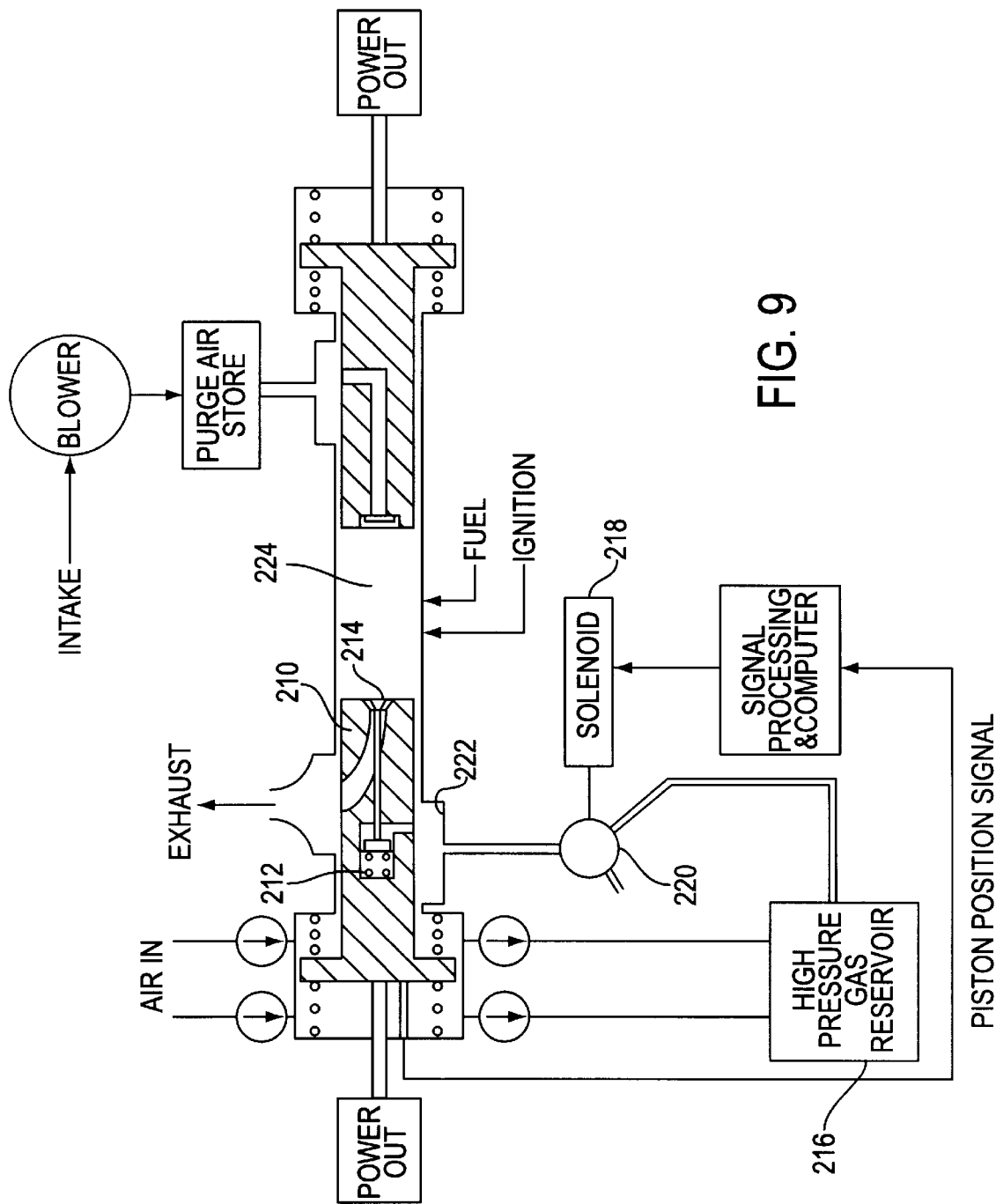
FIG. 9 is a diagram illustrating an alternative embodiment of the invention.

FIG. 9 illustrates an alternative embodiment of the invention which is like FIG. 8, except that the valve actuator for piston 210 includes a spring 212 biasing the combustion-chamber valve 214 toward an open position instead of biasing the combustion-chamber valve closed as in FIG. 2. In the embodiment of FIG. 9, high pressure is applied from the high-pressure gas reservoir 216 to close the combustion-chamber valve 214 in the same manner as the combustion-chamber valve 132 illustrated in FIG. 8 is opened. However, the combustion-chamber valve 214 is opened when the piston 210 travels sufficiently far along its expansion stroke that the combustion chamber pressure falls to less than a selected pressure. Specifically, the valve 214 opens when the force of the spring exceeds the force of the net differential pressure on the combustion-chamber valve 214. Many other types of valve actuator systems known in the art may also be used, including cam and hydraulic valve-actuating systems as well as valves driven directly by a solenoid.

Figure 10:
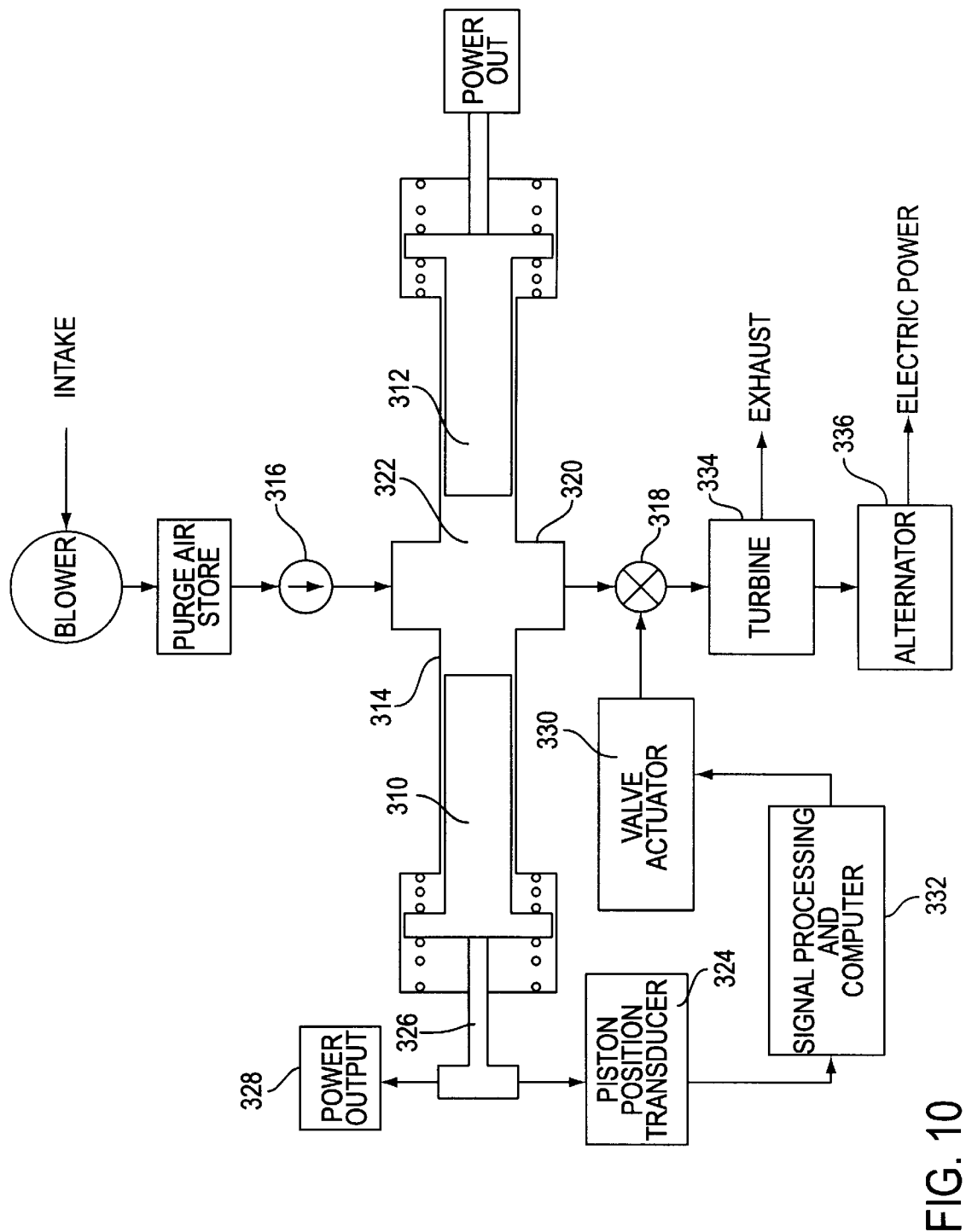
FIG. 10 illustrates yet another alternative embodiment of the invention.

FIG. 10 illustrates yet another alternative embodiment with alternative components which may be utilized in embodiments of the present invention. FIG. 10 illustrates an engine having a pair of pistons 310 and 312 sealingly reciprocating in a cylinder 314. In the embodiment of FIG. 4, the combustion-chamber valves 316 and 318 are located in a head 320 formed in the cylinder wall at the combustion chamber 322, intermediate the pistons 310 and 312. The piston position transducer 324 may be connected to the exterior portion of the piston connecting rod 326, which is also connected to provide the power output 328. Although both valves 316 and 318 may be opened and closed by valve actuators in the manner previously described, FIG. 4 illustrates a combustion chamber intake valve 316 as a check valve in the manner illustrated in connection with FIGS. 2 and 3. The other combustion-chamber valve 318 is switched on and off by its associated valve actuator 330 in response to the piston position transducer 324 and its signal processing and computer circuit 332, which together form a piston-position sensor.

FIG. 10 also illustrates that the exhaust gasses from the combustion chamber 322 may be applied through a turbine 334 having its rotating shaft connected to an electrical power-generating alternator 336 to extract additional energy from the expansion of the combustion products and converting it to electric power for use by auxiliary systems. Alternatively, if the power from the piston rods is utilized to pump a fluid which in turn drives a turbine, the exhaust gases may supplement that fluid, driving the same turbine.

Figure 16:
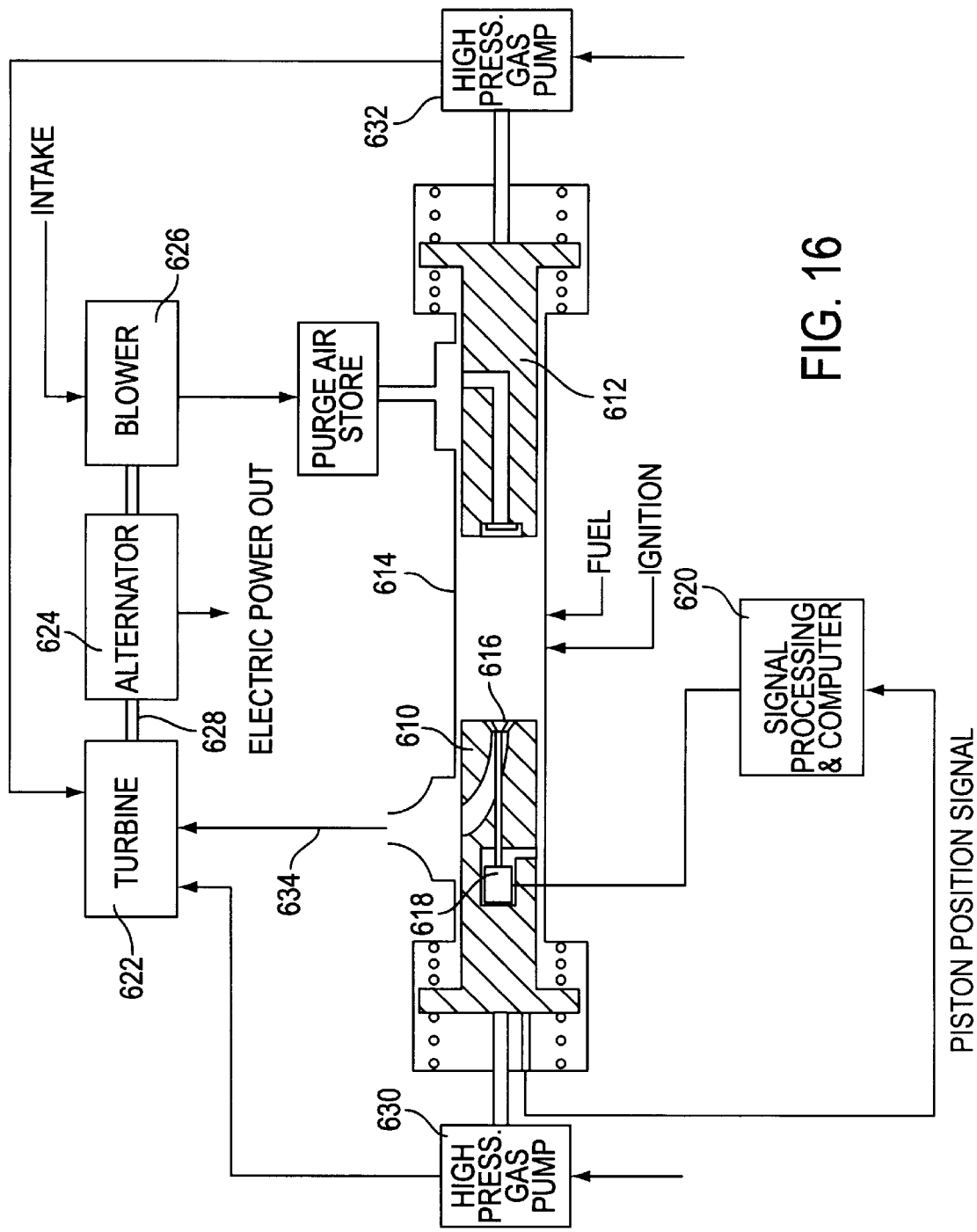
FIG. 16 illustrates another embodiment of the invention.

For example FIG. 16 illustrates the preferred embodiment, including free pistons 610 and 612 in cylinder 614. The embodiment is generally similar to that in the other figures. However, the combustion-chamber valve 616 has an electrical solenoid actuator 618 connected to the signal processing and computer circuit 620. Furthermore, a turbine 622, electrical alternator 624, and a blower 626 are connected for rotation on the same shaft 628. The output power from the reciprocating, free pistons 610 and 612 is directed to high-pressure gas pumps 630 and 632. These gas pumps 630 and 632, as well as the exhaust gases from the combustion process are directed through passageway 634 to the turbine 622 for powering the turbine. The turbine thus drives the alternator 624 and the purge blower 622 through their connection to the common rotating shaft 628. In this embodiment the final output power is the electric power from the alternator 624. Alternatively, the purge air can be derived from a portion of the high-pressure gas from the high-pressure gas pumps 630 and 632.

The alternator may be designed so that it can be energized as a motor by a storage battery during start-up, so that it will drive the purge blower for the initial charge of air in the cylinder 614. In this case it is preferred that an override clutch will disconnect the alternator from the turbine during start-up. Alternatively, the blower can be driven by its own dedicated, electric motor.

Figure 17:
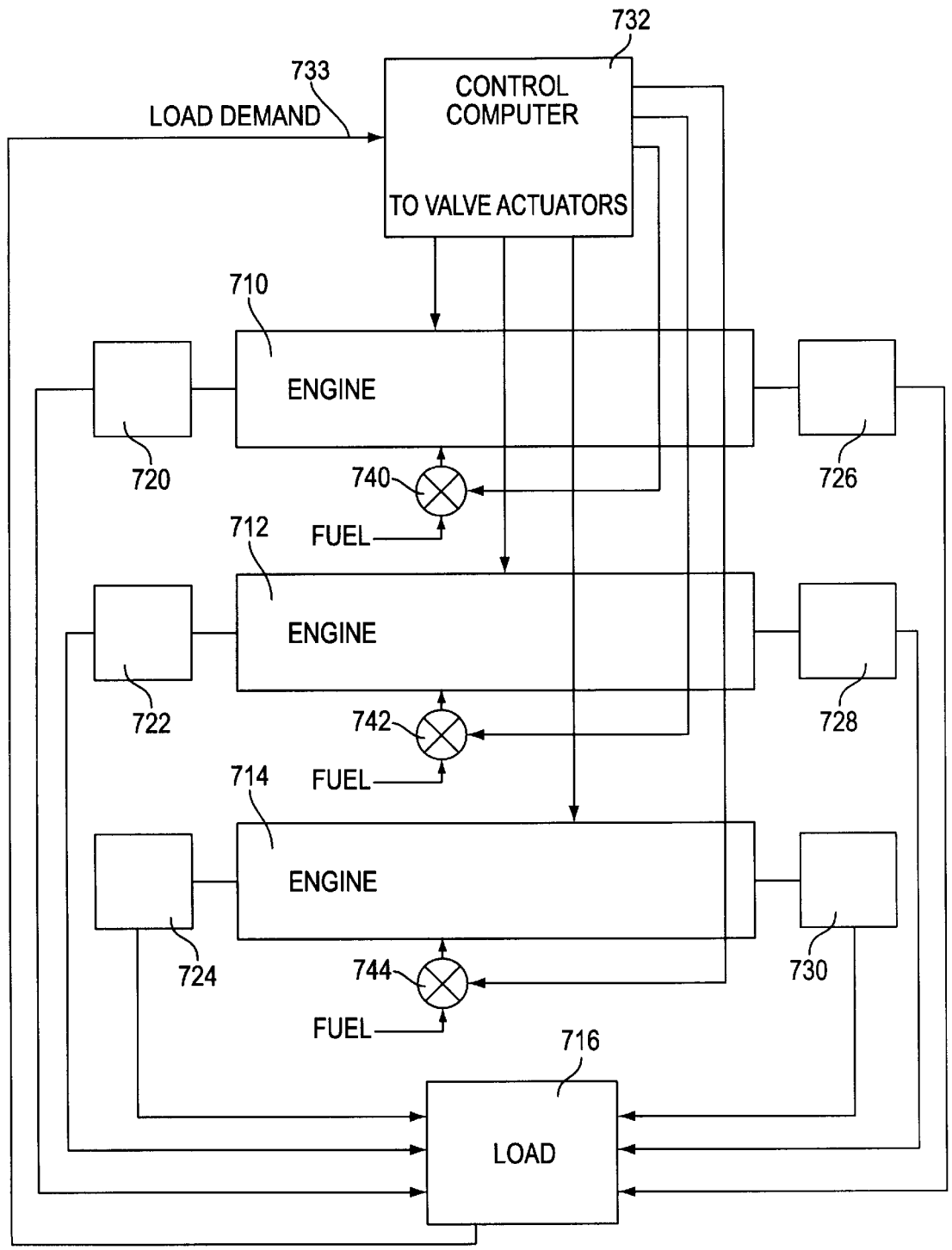
FIG. 17 is a block diagram of a multi-engine alternative embodiment of the invention.

Although the high-pressure gas pumps are shown for clarity as separate blocks which are external of the engine in FIG. 16, they can advantageously be formed by pistons formed as skirts at the end of the free piston 610 and 612, in the manner illustrated in FIG. 3. FIG. 17 illustrates a multi-stage engine comprising a plurality of individual engines 710, 712, and 714. Each of these individual engines is an embodiment of the invention, such as illustrated in FIGS. 1 through 10, and described above. Any number of such individual engines may be utilized in the multi-stage engine, although three are illustrated. The pistons of each of the individual engines are connected through conventional linkage to supply output power to the same load, such as an electrical load 716. For example, the pistons may be connected to electrical alternators 720–730, connected to an electrical load 716. Any of the available alternative power output systems previously described, such as pneumatic or hydraulic, may also be used. Each of the individual engines 710–714 are connected to and controlled by a single control computer 732 in the manner described above. However, each of the individual engines may be selectively enabled or disabled by the computer in order to simultaneously operate selected individual engines, including fewer than all of the individual engines. This enables the multi-stage engine of FIG. 11 to operate with only those individual engines which are necessary to meet the current load demand, which is sensed by the computer from a load demand detector linked to the load 716 and connected at an input 733 to the computer to provide a load demand signal. For example, if the load 716 is electrical, an electric current, voltage, or power detector can operate a single, individual engine under light load and increase the number of engines as the load increases. Similarly, if the load is a vehicle which is propelled by the multi-stage engine, then at idle only a single, individual engine can be operated with all the engines operated for high acceleration and fewer than all for in-town cruising.

One manner of disabling an individual engine is to close its combustion-chamber valves and maintain them in a closed position. This prevents the blower, illustrated in the other figures, from providing combustion air to the combustion chamber. Valves 740, 742, and 744, in communication with the fuel injectors, can also be turned off to prevent the injection of fuel into a disabled combustion chamber. It will be apparent that other control means may also be used, such as disabling of the spark. Valves can also be provided through the blower passageways.

Figure 12:
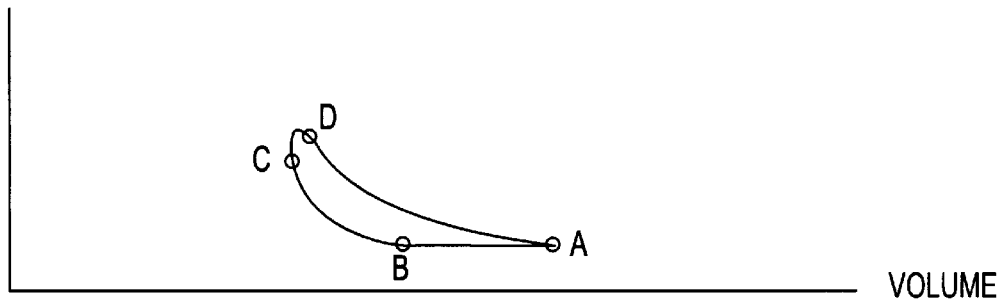
FIGS. 12, 13, and 14 are pressure/volume graphs illustrating the operation of embodiments of the invention under low, medium and high-power conditions.
Figure 13:
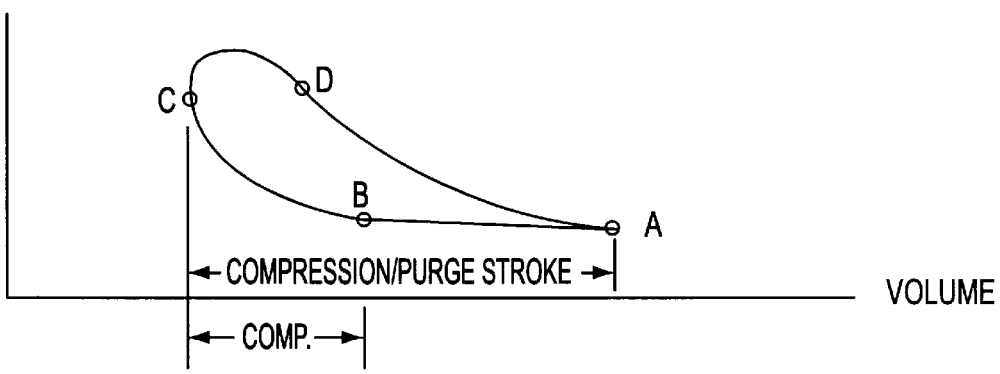
Figure 14:
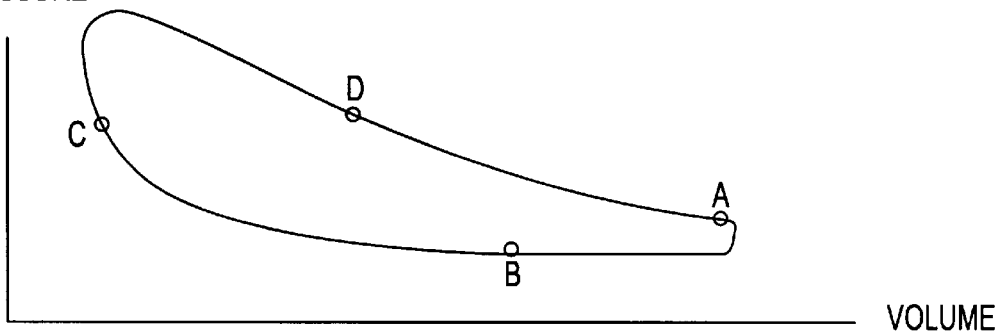

Control of engine power and efficiency with engines embodying the present invention is illustrated in FIGS. 12–14 and includes varying at least one of the piston positions at which the combustion-chamber valves open or close, and preferably both, as well as controlled modulation of the quantity of fuel injected into the combustion chamber. In FIGS. 12–14, the vertical axis is positioned to represent the symmetrical center of the engine with piston displacement away from the center represented by distance along the horizontal axis. The engine is operated at a relatively low power, illustrated in FIG. 14, typically by moving the piston position A at which the combustion-chamber valves are opened and the piston position B at which the combustion-chamber valves are closed toward the left in the figures for reducing the piston stroke. Typically fuel supply is also reduced.

By moving the exhaust valve closing point A to the left, the mass of air trapped in the cylinder for subsequent compression, combustion, and expansion is reduced. The delay in exhaust valve closing effectively reduces the size or displacement of the engine and thus reduces power. The effect is similar to that of reducing the crankshaft throw in a conventional crank drive engine. This method of reducing power is much more efficient than the conventional throttling of inlet air or simply reducing fuel injected in a conventional diesel engine.

FIGS. 12 and 13 illustrate that a very high proportion of the energy of expansion in the combustion chamber is utilized in driving the piston as seen by observing that, at point A by the time the combustion-chamber valves are opened, the combustion chamber pressure has fallen substantially to the pressure of the incoming supercharging pressure of the blower.

When a high-power demand must be met, the position of combustion-chamber valve opening A and combustion-chamber valve closing B may be moved independently and rapidly toward the right and the quantity of injected fuel increased. FIG. 14 illustrates the position A having approached its limit and the position B moved sufficiently far to the right that the ratio of the portion of the expansion stroke from D to A, during which the heat energy of the combustion is extracted from the expanding gas, to the portion of the compression/purge stroke from B to C during which compression occurs, may be made nearly equal for high power output. This results in a relatively high rate of pressure drop after the point A and thus some loss of the combustion gas expansion energy. The loss from incomplete expansion is normally minimal and is only substantial when the engine is operating near the maximum power level. In the event that an exhaust gas turbine is fitted, even this incomplete expansion energy may be partially recovered in the expansion through the turbine. However, the power loss is not nearly as substantial as in a conventional internal-combustion engine and is believed unavoidable for high power output from an engine of a practical size.

Here again moving valve closing point A toward the right in effect increases the displacement of the engine since the mass trapped in the cylinder at point A is greater in this case. The greater mass of air in the cylinder increases the power available to the subsequent compression, combustion, and expansion parts of the cycle. In this type of operation of this free-piston machine, the expansion ratio can approach the compression ratio, which increases the amount of energy lost to the exhaust. While these exhaust losses are greater than when the engine is operating in low power mode, but they are not any higher than those of a conventional internal-combustion engine. This operating point allows the engine to provide peak power with a limited reduction in efficiency.

Figure 11:
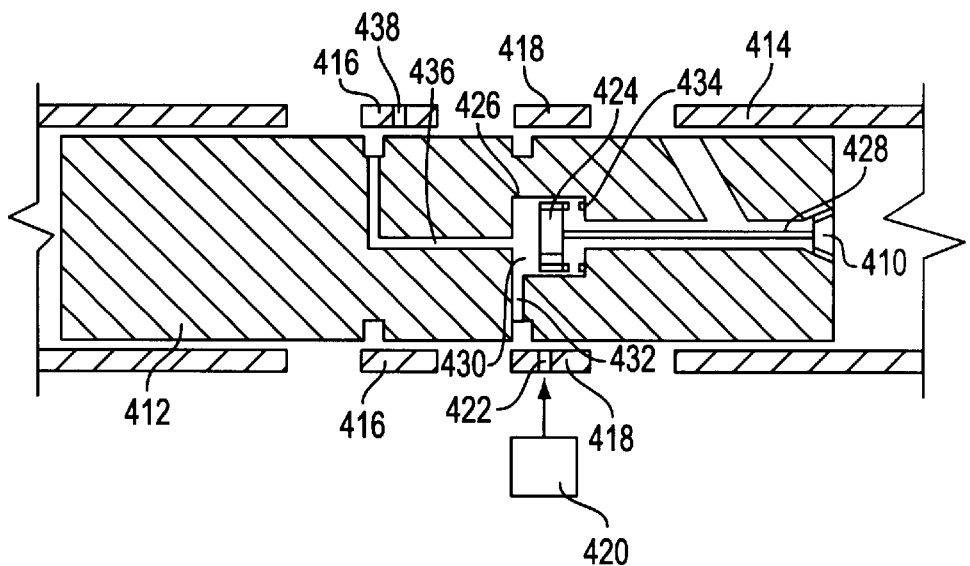
FIGS. 11 and 11A illustrate still another alternative embodiment of the invention.

FIG. 11 illustrates yet another alternative, though not preferred, embodiment of the invention which relies on sliding members forming a spool valve or slide valve for controlling the opening and closing of the combustion-chamber valve 410. In FIG. 11 a piston 412 is mounted in a cylinder 414. A pair of annular slides 416 and 418 are aligned with the cylinder, but provided with sufficient space so they can slide axially to selected positions. A high-pressure source 420 is applied to a port 422 through slide 418. A valve-actuating piston 424 is sealingly reciprocable in a corresponding actuator cylinder 426 within the piston 412. The valve-actuating piston 424 is connected by a connecting rod 428 to the valve 410. The chamber 430 within the cylinder 426 is connected through a piston passageway 432 to the high-pressure source 420 when the passageway 432 comes into registration with the port 422 during translation of the piston 412. In this manner, the pressure from the source 420 forces the piston 424 against the force of a spring 434 to open the combustion-chamber valve 410. Similarly, a piston passageway 436 is connected in communication with a port 438 in the slide 416 when the passageway 436 comes into registration with the port 438 to release pressure applied to the chamber 430 by the high-pressure source 420, and therefore permit the spring 434 to force the combustion-chamber valve 410 closed.

Consequently, the axial position of the annular slides 416 and 418 determine the piston position at which the combustion-chamber valve 410 is opened and is closed.

Figure 11A:
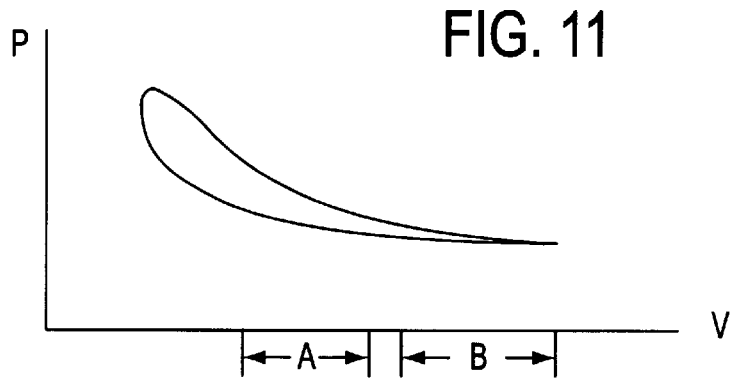

FIG. 11A illustrates a PV diagram for the embodiment of FIG. 11. Desirably the valve would be closed somewhere in the range A, illustrated in FIG. 11A, and would be opened somewhere in the range B, the particular positions determined by the operating conditions of the engine.

Figure 15:
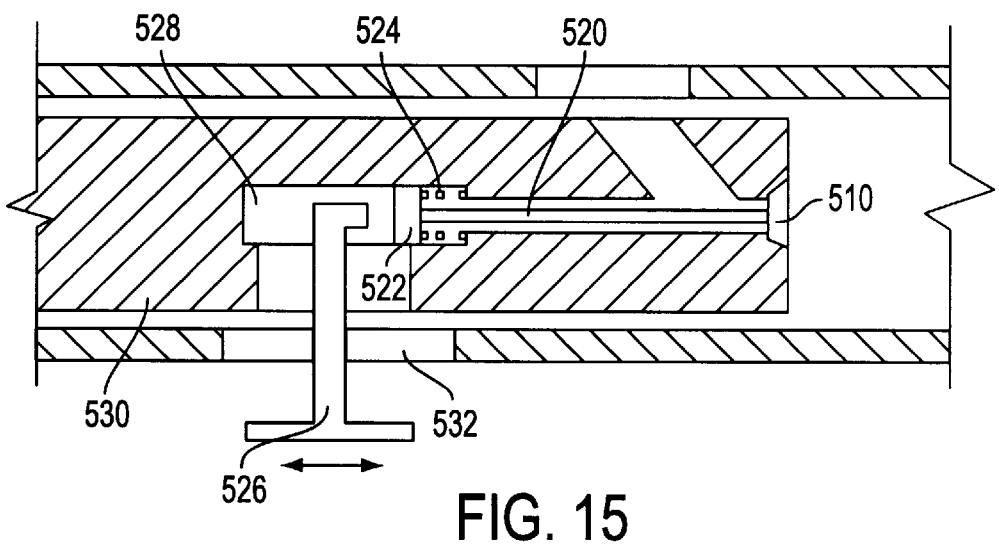
FIG. 15 illustrates another embodiment of the invention.

FIG. 15 illustrates yet another alternative manner of controlling the opening position of a combustion-chamber valve 510. The valve 510 is connected through a connecting rod 520 to a cam follower 522 and biased by a spring 524 to a closed position. An axially slidable finger 526 protrudes into a chamber 528 formed in the piston 530, passing through an opening 532 in the piston 530.

When the piston 530 slides sufficiently leftward in FIG. 15 to cause the finger 526 to engage the cam follower 522, further leftward motion of the piston 530 will force the combustion-chamber valve 510 open. FIG. 15 therefore illustrates that entirely mechanical actuation of the combustion-chamber valves may also alternatively be accomplished. Although the embodiment of FIG. 15 suffers from the substantial disadvantage that the valve will open and close at the same position in piston reciprocation, other similar actuating structures may be utilized and visualized by those of ordinary skill in the art so that the combustion-chamber valve 510 may be both opened and closed at different positions by such mechanical structures.

The art of engine combustion and efficiency control has been revolutionized by the advent of cheap and powerful computers. Engines are controlled to an extent far beyond anything realized by the simple mechanical devices of the recent past. Fuel and air mixtures, for example, are controlled cycle by cycle so as to maximize combustion efficiency, using computer-controlled injection systems. The engine in the present invention allows an equally profound advance in control of the inlet and exhaust valve motions, so as to allow previously unavailable processes. An important example is the control of the mass flow through the thermodynamic cycle by valve time of closing, so as to eliminate the very wasteful throttling process in the present conventional spark ignition engine as a means for controlling output power. Technical details of the reasons for these controls and their effects are found in papers published in the proceedings of the Society of Automotive Engineers.

In the present invention, the control computer is fed information on piston position by a position sensor of any of the types well known, such as linear variable differential transformers, or proximity sensors operating on a tapered portion of the piston or many others capable of giving an electric voltage proportional to piston position. In addition, the computer receives information from sensors detecting unburned fuel, carbon monoxide, free oxygen and other information which the designer may wish to have so as to simultaneously maximize fuel efficiency and reduce pollution. The control computer then operates to match required power to engine conditions so as to achieve optimum values of power, efficiency and other features, such as responsiveness to a change in power.

Starting of an engine embodying the present invention requires an auxiliary power source, such as a conventional storage battery. Preferably the pistons are at rest at their inner proximal position, although they may also be located at an intermediate position at which a drive spring is relaxed.

For start-up, the control senses the command to start, and directs a small amount of fuel to the combustion chamber where it is ignited by a spark and causes the piston to move toward the outer limit. The combustion chamber has been previously purged at the last cycle of the engine on shut-down. The control opens the exhaust valve and allows an exhaust and purging action from either a previously stored air source or from the outward motion of the piston pumping air by the outer ends of the piston, or from a dedicated blower powered by an electric or hydraulic motor or by the exhaust turbine. The next cycle of the piston will be near normal in power output as described above for steady state operation, except that the valve timing may initially provide a relatively shorter stroke and then the piston position at which the valves are opened and closed is changed as the stroke increases to steady state operation.

It is important to note that the starting procedure described here requires far less stored energy than is normally required, since there is no need to supply the compression energy of the air in the cylinder. In addition there is no need to overcome the inertia of a conventional crank mechanism. The great majority of the start energy comes from initial combustion of a small amount of fuel as the pistons are stationary near their inner position. Since the stored energy required for starting is low, a far smaller battery or other storage medium is required. Another advantage is that the starting sequence may be repeated many times without depleting the energy store. This is in contrast to the conventional free-piston engine in which a very high starting energy input is required to accelerate the piston sufficiently to achieve compression ignition and move the piston through a full stroke in order to uncover the intake and exhaust ports.

During normal operation, if the operator demands more power, the control injects more fuel, while at the same time allowing more air to go through the thermodynamic cycle by earlier closing of the combustion-chamber valves. If the power requirement is high, then the control may open the valves earlier in the expansion process so as to give a higher mean effective pressure of the cycle, leaving some residual expansion energy in the exhaust either to be recaptured in an exhaust turbine or expanded to the atmosphere, as is presently done in conventional engines.

If a power reduction is demanded, the control cuts down on the fuel injected and the air mass in the cycle by a later closing of the combustion-chamber valves during the purge process. The control takes advantage of the fullest expansion ratio consistent with other demands by a later opening of the exhaust port.

If a low power is demanded, the control may shut down one or more pairs of cylinders and allow only the ones to operate which, at optimum efficiency, can supply the requirement. Thus, a vehicle which has three pairs of pistons may, in city driving, be using only one of them operating at a fraction of its capability. Then when highest power is demanded, the control can start the idle pairs and operate all three at full power. This type of operation can greatly increase the mechanical efficiency of the engine over the conventional one in which all mechanisms must operate even when the power required is very small compared to full engine capability. The full mechanism requires power to operate even if it is delivering very little power, so the operation of the full mechanism in the conventional engine is extremely wasteful for low load conditions.

Fuel injection rate is not only controlled by power, but also by sensing presence of unburned fuel (indicating excessive fuel injected or deficient air flow) and by presence of carbon monoxide, also indicating deficient air. All of the above is well known to the art, but the flexibility of the free-piston engine of the present invention allows full application of optimization strategies previously unavailable as a result of the rigidity of the conventional, fixed displacement and fixed valve timing engines.

Although two opposed pistons are preferred for balance and symmetry of the process, the principles of the present invention may be applied to a single piston engine terminating at the point of symmetry of the illustrated engines. Such an engine may have a single combustion-chamber valve, although use of two combustion-chamber valves is more practical. With two valves the engine would operate in the manner previously described. Both valves can be located in the head, both valves can be located in the piston, or one in each with communicating passageways of the type illustrated in the previously described figures.

If a single valve is used, then purging and supercharging cannot be easily accomplished. In such an embodiment, the engine could operate in a four-stroke mode, rather than the two stroke mode described above. In a two-stroke mode, combustion and expansion occur in one stroke, while exhaust, intake and compression all occur in the second stroke. In a four-stroke mode of operation, combustion and expansion occur in one stroke, exhaust occurs in the second stroke, intake occurs in the third stroke, and compression occurs in the fourth stroke. This would allow a higher compression ratio for the same stroke length, but will require more energy storage for driving the piston through the exhaust, intake, and compression strokes.

Another alternative for the case of a single valve is to take air into the cylinder at the end of the expansion stroke, and then discharge a mixture of air and exhaust gasses at the beginning of the compression stroke. This approach relies on mixing of the incoming air and the products of combustion to assure an adequate supply of the air to the combustion process. While this approach is not preferred, it shows that two-stroke operation with a single valve is possible.

The present invention can now be seen to provide a variety of advantages. The variable valve timing allowed by the present invention permits independent control of both the expansion ratio and the compression ratio. As a result, the expansion ratio can be greater than the compression ratio and the ratio between them can also be controlled. This allows variation in the power output, while retaining high fuel efficiency at all power levels. Full or near full expansion of the combusted gasses is permitted. Full expansion also makes the engine considerably quieter because the valves open when there is a lower pressure in the combustion chamber, as illustrated at A in FIGS. 6 and 7. For operating the engine in a low power, high efficiency mode, including idle, the valves are timed to provide a higher expansion ratio than compression ratio and to provide a smaller stroke. Consequently, the engine becomes an efficient, small displacement engine at low power. The large excess of expansion beyond compression permits the energy of expansion to be recovered instead of being exhausted with the noise and sudden pressure drop characteristic of a conventional, internal-combustion engine. This also eliminates the throttling loss inherent in conventional internal-combustion engines where the stroke or swept volume is always constant.

For high-power operation, both the compression and expansion ratios can be increased and the compression ratio made nearly equal to the expansion ratio as in a conventional internal-combustion engine. With both ratios and the quantity of injected fuel being increased, the stroke increases making the engine operate as a large displacement engine having an increased, swept volume.

Because these timing changes can be made relatively quickly with simple, electronic changes to the combustion-chamber valve opening positions, a rapid, high power boost is possible. Efficiency at high-power operation is less than at low-power operation because the expansion stroke is operating at a higher cycle pressure and the valves open before that pressure is reduced to atmospheric pressure. Nonetheless, control of the timing provides more efficient operation than is currently available. The remaining available power from the pressure drop to atmospheric in the exhaust gas can be partially recaptured by an exhaust turbine as is known in the art.

Another advantage of a practical and efficient free-piston internal-combustion engine is that it permits the use of gas bearings, particularly between the piston and cylinder, rather than oil based lubricants. Gas bearings can be used because there are no side loads, such as result from the use of a crank mechanism. Gas bearings provide essentially non-contact motion, do not require rings, and therefore provide minimum wear and maximum lifetime. Elimination of oil based lubricants eliminates a major source of cylinder fouling and exhaust pollution. The engine runs without oil and has no side loads so it may run very hot and not need a conventional cooling jacket, thus decreasing cost and increasing efficiency since heat loss during expansion is minimized.

The needed gas pressure for operating the gas bearings may be captured from the working gas cycle by way of check valves feeding a storage chamber. Another alternative is to use a dedicated gas pump that is driven by the piston motion or from a gas spring used as the return means for the pistons. These alternatives are known in the prior art related to free-piston Stirling engines.

Different fuels may require different control algorithms, including different piston positions at which the combustion-chamber valves are opened and closed, fuel is injected and ignition is initiated.

For the use of natural gas as a fuel, the fuel would preferably be injected just after point B in FIGS. 6–8 at which the combustion-chamber valves are closed. This would allow a low pressure gas injection and good mixing of the fuel and air before ignition.

An engine constructed according to the present invention has mechanical simplicity, high efficiency, low startup energy, light weight, low cost and a relatively long life and would be especially useful as an adjunct power source for an electric vehicle. The free-piston internal-combustion engine of the invention allows full variability of inlet and exhaust valve timing, fuel injection and ignition timing, and variable piston swept volume, as well as capability of operating only some of the pistons in a multiple cylinder engine while leaving some non-operational. The power of an internal-combustion engine is proportional to the mass flow rate of air going through the thermodynamic cycle within the combustion chamber. Consequently, in embodiments of the invention, it is proportional to the volume of gas in the cylinder when the combustion-chamber valves close and compression begins. That volume is variably controllable in embodiments of the invention. The free piston purely linear motion eliminates side forces on the pistons so as to allow use of gas bearings, eliminating the need for oil, and because of the absence of oil on the surfaces, allowing adiabatic (non-cooled) operation using suitable high temperature materials (ceramics) for the cylinder walls.

Figure 18:
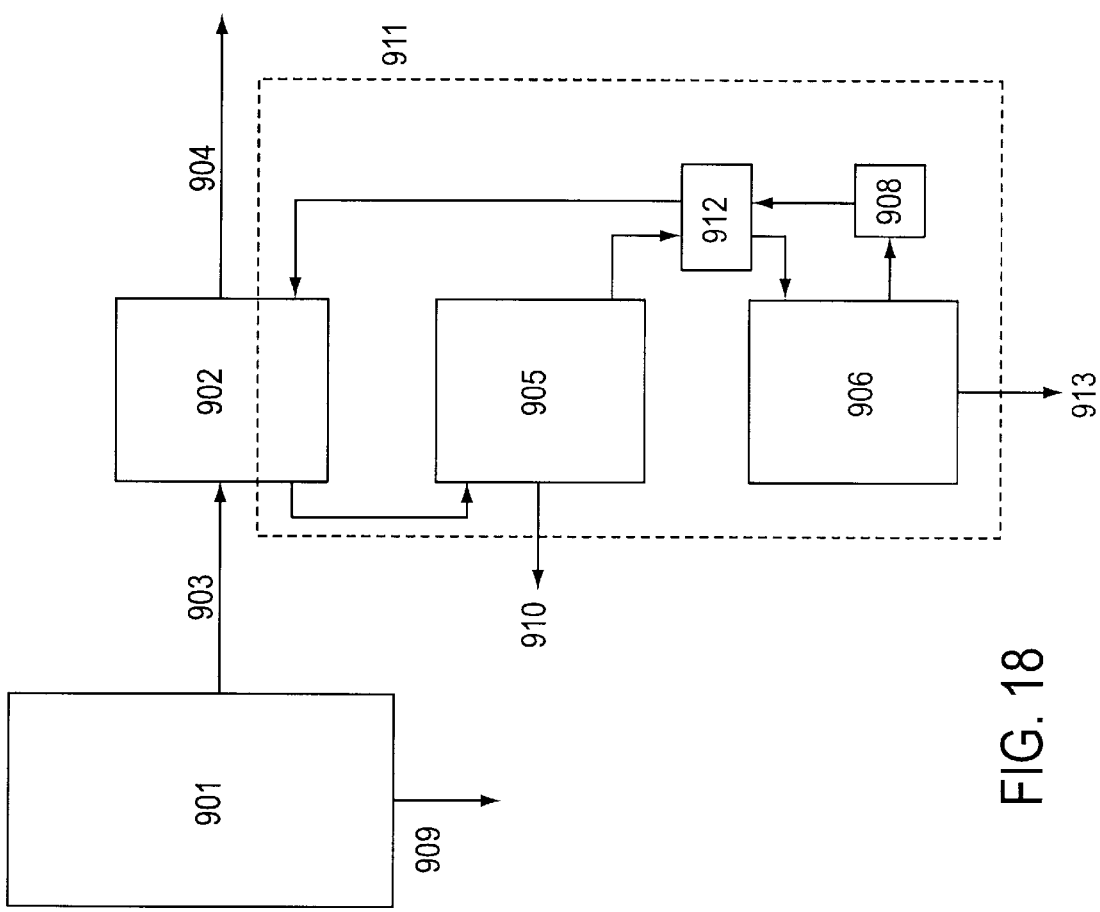
FIG. 18 is an embodiment in which the free-piston engine serves as a topping cycle for a heat engine.

FIG. 18 shows another embodiment that includes a heat engine 911 for extracting work from high-temperature exhaust gasses 903 from a nearly adiabatic free-piston internal-combustion engine 901 which supplies a work output 909. The heat engine is preferably a Stirling engine or steam engine. The working fluid for a steam engine is water while the Stirling engine may use helium, hydrogen or other gas. The heat engine comprises a heat exchanger 902 with the exhaust gasses from the internal-combustion engine. This heat exchanger supplies heat to a working fluid for the heat engine. A work extraction means 905 removes energy in the form of work 910 from the high-temperature working fluid. The fluid then goes through an internal heat exchanger 912 which cools the fluid before it enters a low temperature heat exchanger 906. The low temperature heat exchanger removes heat from the working fluid and rejects it to a lower temperature heat sink 913. The heat sink may be the environment or it may be a heat recovery heat exchanger for supplying space heating, water heating, or driving an absorption refrigeration system. Pumping means 908 then moves the working fluid back through the internal heat exchanger to the high temperature heat exchanger 902. The internal heat exchanger is not necessary for operation in a steam engine, but improve cycle efficiency.

Unlike other free-piston engines, the exhaust temperatures from the current invention would normally be in excess of 600° C. which means that an efficiency of 25 to 30 percent is possible for the heat engine. This arrangement further improves the total system efficiency.

Figure 19:
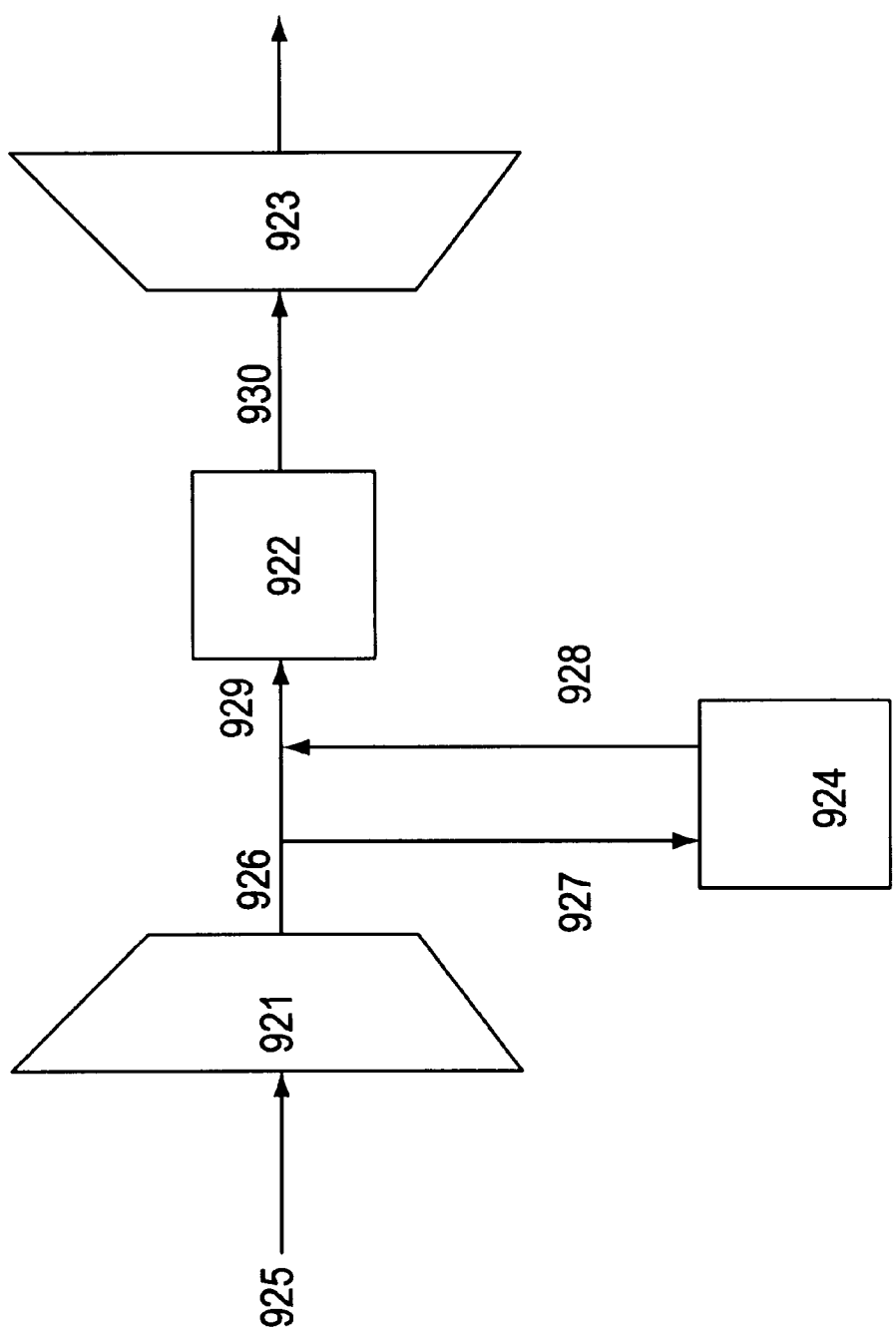
FIG. 19 shows an embodiment is which waste heat from the free-piston engine replaces a portion of the burner heat for a gas turbine.

FIG. 19 is another embodiment in which a nearly adiabatic free-piston internal-combustion engine acts as a topping cycle. The gas turbine cycle comprises compressor 921 which supplies high-pressure air to burner 922 and turbine 923. The intake air 925 is normally from the atmosphere. The nearly adiabatic free-piston internal-combustion 924 takes high-pressure air 927 from the discharge stream 926 leaving the compressor. This engine preferably uses gas bearings to support the piston and high-temperature ceramic materials to handle the high operating temperatures. The engine returns high temperature air 928 to the discharge stream 926 which mix to form the burner intake air stream 929. The burner further raises the temperature of the air stream and provide turbine inlet air 930. The turbine exhaust 931 may go directly into the atmosphere or it may go through a heat recovery heat exchanger to drive a steam cycle.

In this embodiment the free-piston internal-combustion engine displaces a portion of the heat supplied by a burner for a gas turbine. A key difference from prior art is that the free-piston internal-combustion engine can supply very high temperature gas to the burner, typically in excess of 600° C. Another feature of this embodiment is that the compressor and turbine temperatures and pressures are essentially the same with the engine running as with all the heat supplied by the burner. These similar conditions mean that the engine may be incorporated into existing gas turbine designs with a minimum of effort. In addition the turbine may run without the free-piston internal-combustion engine. Depending on the exhaust temperatures of the internal-combustion engine and the inlet temperatures for the turbine, it may be possible to eliminate the need for burner operation entirely. While this drawing shows a single free-piston internal-combustion engine, it may be desirable to use multiple engines.

The embodiment in FIG. 19 can provide extremely high cycle efficiencies. Combined-cycle gas-turbine/steam plants now have thermal efficiencies of better than 50%. The new adiabatic free-piston internal-combustion engine can achieve an efficiency of over 50%. If the waste heat from the free-piston engine can displace the full burner heat input, the combined cycle efficiency may approach 75%.

Another way of looking at the potential benefit of the topping cycle is in terms of marginal efficiency. The burner in the gas turbine cycle has essentially zero mechanical efficiency in that all its output is in heat rather than work. If the internal-combustion engine is nearly adiabatic then energy input can either go into heating the exhaust gasses or as work output. The heat output merely displaces heat input from the burner. This analysis means that the marginal efficiency of the engine is essentially 100%. Marginal efficiency in this case means the addition work out of the engine divided by net additional heat input to the engine and turbine. The bottom line is that any work from the internal-combustion engine is additional work that would not have been available from operating the burner. This set up should have great utility in improving the performance of existing gas turbine power plants.

Figure 20:
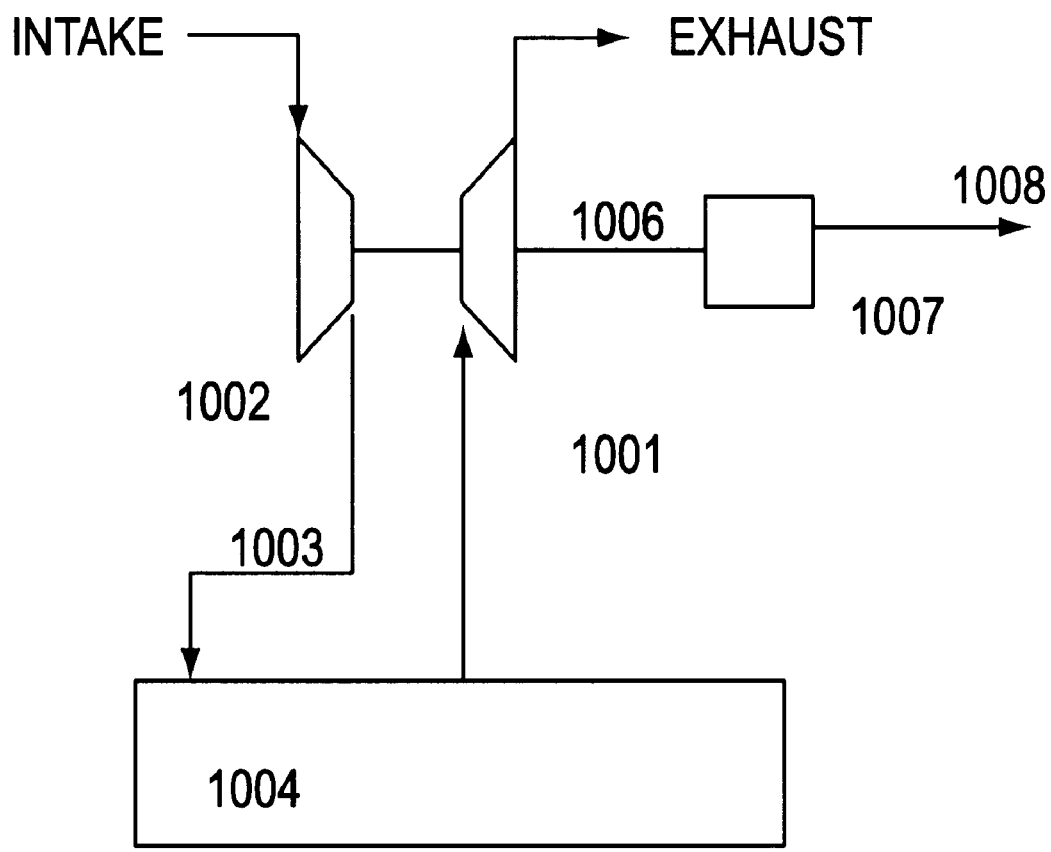
FIG. 20 is an embodiment that includes a turbocharger that drives a generator.

FIG. 20 shows a preferred embodiment that includes a turbine for producing electrical power from an engine such as the one described in FIG. 4 or other embodiment that has a pneumatic output. Turbine 1001 drives compressor 1002 which supplies pressurized air 1003 to engine 1004. The engine produces hot, pressurized exhaust 1005 that drives turbine 1001. The turbine also has a shaft output 1006 that drives a high-frequency generator 1007. The generator produces alternating electric power 1008.

The air pressure going into the engine would normally be several times atmospheric at full-power conditions. At lower loads the engine inlet pressure would drop to near atmospheric pressure. It may be desirable to drop the inlet pressure below atmospheric at very low loads. In this case the compressor would could act as turbine to extract work from the air going to the engine. In all these operating modes the engine inlet pressure is varied with a minimum of efficiency loss.

This configuration allows simple controls on fuel injection to give a large variation in engine output while maintaining efficiency. The key reason for this simplicity is that engine power output, turbine output, and compressor power all vary approximately with the cube of engine speed. For small power outputs only a small amount of fuel is injected into the cylinder. The piston speed is low and the resulting discharge pressure and flow are low. If the piston speed doubles, the piston's kinetic energy increases by a factor of four. For each stroke the amount of fuel and air required to accelerate the piston also increases by a factor of four. Since there are twice as many strokes in a give time, fuel input increases by a factor of eight. The inlet and discharge air pressures also increase by a factor of four since the turbine and compressor speeds double. These relations mean that increasing the amount of fuel injected in to the engine will also result in an appropriate increase in air supply to the engine and power removed by the turbine. Thus simple injector controls can give an efficient way of varying engine capacity.

Figure 21:
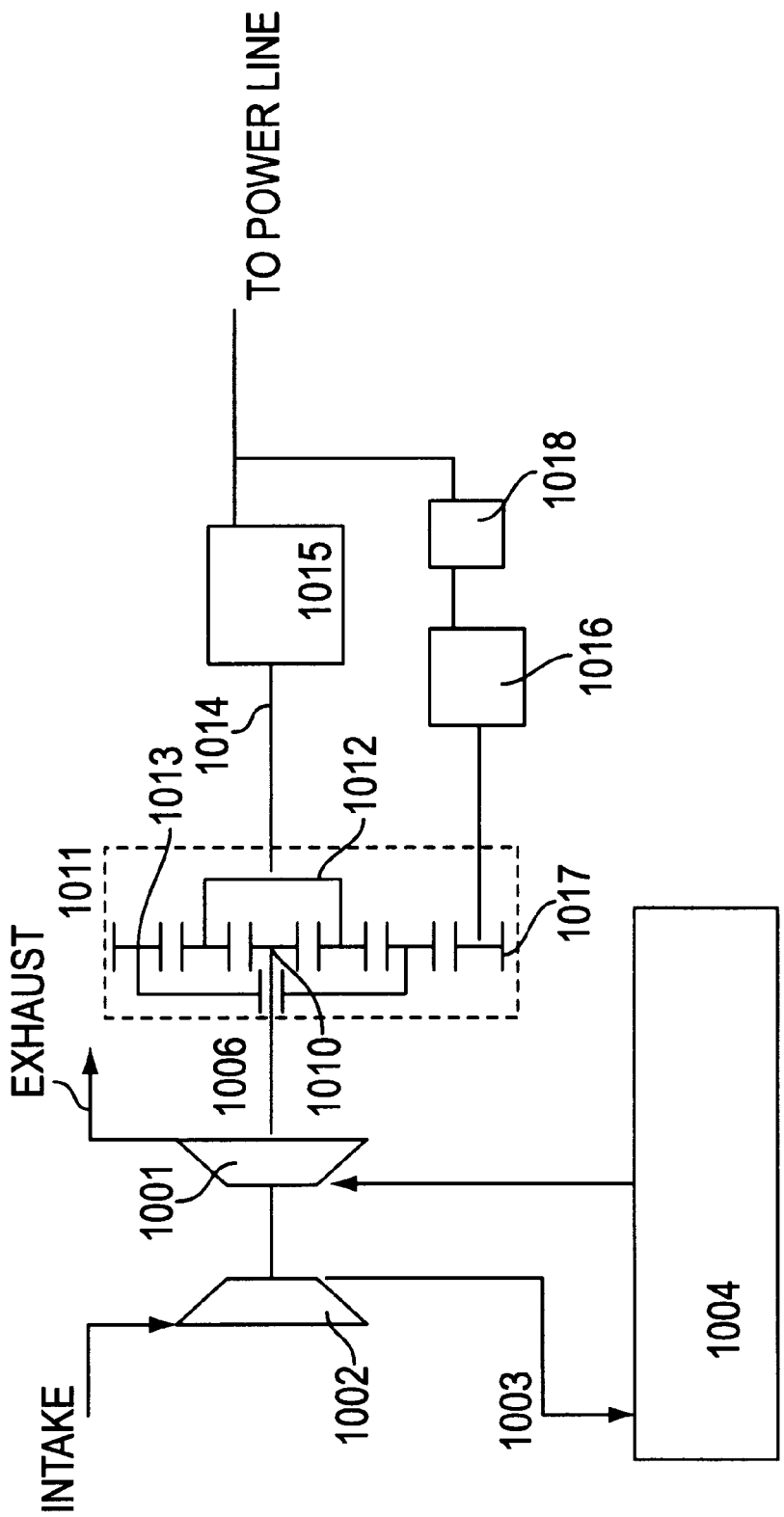
FIG. 21 is a variation of the embodiment of FIG. 20 that includes a planetary gear train and a variable-speed motor-generator that compensate for changes in turbine speed and thus provide a constant output speed In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

FIG. 21 shows a variation of this turbocharged generator arrangement that can provide a fixed frequency output. This configuration uses planetary gears or other epicyclic gears to provide a speed reduction and to convert the variable speed of the turbine into a fixed speed output. As in FIG. 20, the turbine 1001 drives compressor 1002 which supplies pressurized air 1003 to engine 1004. The engine produces hot, pressurized exhaust 1005 that drives turbine 1001. The difference is that the turbine drives the sun gear 1010 of a planetary gear set 1011. The planet carrier 1012 is driven by the sun gear 1010 and ring gear 1013. Output shaft 1014 connects the planet carrier to the main generator 1015. The main generator would normally run at a constant speed to supply a fixed frequency output of 50 or 60 Hz. An auxiliary variable-speed motor 1016 is connected to a spur gear 1017, which drives the ring gear. The variable-speed motor is preferably a three-phase induction motor that is driven by a variable-frequency drive, 1018. Other possible variable-speed motor and drive combinations include DC and switched-reluctance systems.

The planetary gears allow a relatively small variable-speed motor and drive to compensate for speed variations from the turbine. The maximum turbine speed occurs when the auxiliary shaft is stopped. At slow turbine speeds, the auxiliary motor increases its speed to compensate and maintain constant speed to the main generator. The peak power output from the auxiliary motor occurs at ⅔ of full turbine speed at which point the auxiliary output power is 4/27 (about 15%) of the full-load turbine output.

If the auxiliary variable-speed motor is equipped with a regenerative drive, it may also be run as generator. In generator mode, the auxiliary motor shaft would turn in the opposite direction and allow the turbine to run at a faster speed. For this arrangement the turbine speed can increase by approximately 12% beyond that corresponding to a stopped auxiliary shaft. The net result is that the auxiliary motor-generator can be sized for only 10% of the turbine power output.

Another benefit of the planetary gears is their ability to act as a speed reducer. A speed reduction of 5:1 or greater is possible and would allow the turbine to run at a much higher speed than that of the main generator. Of course additional gears or other speed reduction means could be added to further increase the speed reduction if substantially greater ratios are required. This embodiment should be quite useful in generating power for residential or commercial applications.

While certain preferred embodiments of the present invention have been disclosed in detail, it is to be understood that various modifications may be adopted without departing from the spirit of the invention or scope of the following claims.

We claim:

1. A free-piston internal-combustion engine, comprising:
   a cylinder;
   a piston that is slidingly reciprocatable in said cylinder;
   a combustion chamber within said cylinder and which has a boundary defined by said piston wherein the motion of said piston compresses gas in said chamber during a compression stroke of said piston and expands gas in said chamber during an expansion stroke of said piston;
   a driver for driving said piston in direction that compresses gas in said chamber;
   intake means for drawing gas from a source into said chamber;
   means for adding fuel to said chamber;

exhaust means for venting products of combustion from said chamber; and means for controlling said intake and exhaust means so that the expansion stroke of said piston following ignition of fuel in said combustion chamber is greater than the compression stroke before ignition.

2. A free-piston internal-combustion engine as set forth in claim 1, further comprising a gas bearing for supporting said piston within said cylinder.

3. The free-piston internal-combustion engine of claim 2 wherein total heat transferred through the walls of said cylinder is less than 20 percent of the lower heating value of the fuel combusted in said engine.

4. The free-piston internal-combustion engine of claim 3 that further comprises a heat engine that uses the exhaust gasses as a heat source.

5. The free-piston internal-combustion engine system of claim 4 wherein said heat engine is a Stirling engine.

6. The free-piston internal-combustion engine system of claim 4 wherein said heat engine is a steam engine.

7. The free-piston internal-combustion engine of claim 1 wherein said intake means comprises a flow path between said source of gas that can support combustion and the end of the combustion chamber opposite said piston and at least one check valve located in said flow path, said exhaust means comprises at least one check valve located in the cylinder wall, said control means comprises a means for preventing flow through said exhaust valve during the expansion stroke of said piston, and said means for adding fuel to said chamber comprises a fuel injector that injects fuel into said chamber.

8. The free-piston internal-combustion engine of claim 7 wherein said return means comprises a second combustion chamber located on the opposite side of said piston from the first combustion chamber.

9. The free-piston internal-combustion engine of claim 7 wherein said return means comprises a gas spring.

10. The free-piston internal-combustion engine of claim 7 wherein the pressure of gasses after they exit said exhaust check valve is higher than the pressure of said source of gas so that said engine also acts as a compressor.

11. The free-piston internal-combustion engine of claim 10, further comprising a turbine located in a flow path between said exhaust means and the atmosphere.

12. The free-piston internal-combustion engine of claim 11 wherein said means for preventing flow through said exhaust valve comprises a slide valve that is actuated by the pressure inside said combustion chamber.

13. The free-piston internal-combustion engine of claim 1 where said exhaust means comprises a valve in a flow path between said chamber and the atmosphere with a valve actuator that controls the position of said valve.

14. The free-piston internal-combustion engine of claim 13 where said intake means comprises a flow path between said source of gas and said chamber and an intake valve in said flow path.

15. The free-piston internal-combustion engine of claim 14 where said intake means further comprises a blower for pressurizing said gas above atmospheric pressure and said intake valve comprises a check valve.

16. The free-piston internal-combustion engine of claim 15 further comprising a piston-position sensor and means for controlling the operation of said exhaust valve and said means for adding fuel in response to piston position.

17. The free-piston internal-combustion engine of claim 1 further comprising a spark ignition means located in said combustion chamber.

18. An internal-combustion engine, comprising:

a cylinder;

a piston slidingly movable in said cylinder in first and second opposite directions;

a combustion chamber within said cylinder having a boundary defined by said piston, wherein said piston compresses gas in said chamber during a compression stroke of said piston in said first direction, and expands gas in said chamber during an expansion stroke of said piston in said second direction;

means for adding fuel to said chamber;

a driver for driving said piston in a direction that compresses gas in said chamber;

an intake port located in a wall of said cylinder for admitting gas into said chamber from a source;

an exhaust port located in a wall of said cylinder for venting gaseous products of combustion from said chamber;

an auxiliary port located in a wall of said cylinder;

pressure-activated valve means for closing said auxiliary port in response to a second predetermined pressure lower than a first predetermined pressure created at the end of said expansion stroke;

wherein said piston uncovers said intake and exhaust ports at the end of said expansion stroke to allow said gaseous products to be vented from said combustion chamber and to allow fresh gas to be admitted to said combustion chamber, and said piston begins its compression stroke only upon covering said auxiliary port during motion in said first direction, such that said expansion stroke following ignition of said fuel in said chamber is longer than said compression stroke.

19. A free-piston internal-combustion engine as set forth in claim 18, said engine further comprising gas bearing that supports said piston within said cylinder.

20. A means for controlling output power from a free-piston internal-combustion engine with pneumatic output comprising:

a compressor that supplies air to the inlet to the engine, a turbine that receives a higher-pressure gas output from the engine and which drives said compressor and which is connected to a shaft output, means for controlling the amount of fuel entering said engine so that the amount of fuel to said engine increases when increased power output is required, which increases the pressure and flow of gas exiting said engine which increases the speed of said turbine and said compressor so that there is a corresponding increase in air supplied to said engine.

21. The means for controlling output power from a free-piston internal-combustion engine of claim 20, further comprising:

epicyclic gears with a first input that is connected to said shaft output from said turbine, a variable-speed motor-generator that is connected to a second input to said epicyclic gears, a shaft output from said gears so that the speed of the variable-speed motor-generator can compensate for changes in turbine speed to maintain close to a constant output speed from said epicyclic gears.

22. A power plant including a gas turbine with a shaft output, a first compressor that is driven by said gas turbine for supplying a stream of compressed air, and a free-piston internal-combustion engine utilizing compressed air from said compressor to generate power in addition to power generated by said gas turbine, and providing exhaust gases to said stream of compressed air, said free-piston internal-combustion engine comprising:

a cylinder;

a piston that is slidingly reciprocatable in said cylinder;

a combustion chamber within said cylinder and which has a boundary defined by said piston wherein the motion of said piston compresses gas in said chamber during a compression stroke of said piston and expands gas in said chamber during an expansion stroke of said piston;

a driver for driving said piston in direction that compresses gas in said chamber;

intake port into said chamber that received compressed air from said first compressor;

means for adding fuel to said chamber;

exhaust port for venting products of combustion from said chamber into the inlet of said gas turbine; and a gas bearing that supports said piston in said cylinder so as to allow the power plant to operate at high temperatures without thermal decomposition of lubricant.

23. The power plant of claim 22 where said free-piston internal combustion engine further comprises a second compressor that is driven by said piston and which is located in a flow path between said first compressor and said inlet port so as to further raise the pressure of air entering said cylinder.

24. The power plant of claim 22 further comprising a check valve in said intake port.

25. The power plant of claim 24 further comprising means for controlling flow through said exhaust port.

26. The power plant of claim 24 wherein the pressure of gases exiting said exhaust means is higher than the pressure of gases leaving said first compressor so that said engine acts as a compressor.

27. The power plant of claim 22 wherein at least 80% of the waste heat generated by said free-piston internal combustion engine goes into heating the gases leaving said engine.

* * * * *